(12) United States Patent
Shuman

(10) Patent No.: US 6,857,337 B2
(45) Date of Patent: Feb. 22, 2005

(54) CONVERTIBLE CLIPLESS BINDING/ UNBOUND BICYCLE PEDAL

(76) Inventor: Derek Barnet Shuman, 1442A Walnut St. #240, Berkeley, CA (US) 94709

( * ) Notice: Subject to any disclaimer, the term of this patent is extended or adjusted under 35 U.S.C. 154(b) by 0 days.

(21) Appl. No.: 09/918,580

(22) Filed: Jul. 31, 2001

(65) Prior Publication Data

US 2003/0029271 A1 Feb. 13, 2003

(51) Int. Cl.$^7$ ................................................ G05G 1/14
(52) U.S. Cl. ...................................... 74/594.6; 74/594.4
(58) Field of Search ............................. 74/594.4, 594.6; D12/125; 36/131

(56) References Cited

U.S. PATENT DOCUMENTS

| | | | | |
|---|---|---|---|---|
| 575,712 | A | * | 1/1897 | Hamilton et al. ........... 74/594.6 |
| 4,599,915 | A | * | 7/1986 | Hlavac et al. .............. 74/594.4 |
| 4,893,523 | A | * | 1/1990 | Lennon ....................... 74/594.6 |
| 5,003,841 | A | | 4/1991 | Nagano ....................... 74/594.4 |
| 5,771,757 | A | | 6/1998 | Hanamura ................... 74/534.4 |
| 5,784,930 | A | * | 7/1998 | Ueda ............................ 74/594.6 |
| 5,784,931 | A | | 7/1998 | Ueda ............................ 74/594.6 |
| 5,802,930 | A | * | 9/1998 | Chen ........................... 74/594.6 |
| 5,806,379 | A | | 9/1998 | Nagano ....................... 74/594.6 |
| 5,916,332 | A | | 6/1999 | Chen ........................... 74/596.6 |
| 6,012,356 | A | | 1/2000 | Ueda ........................... 74/594.6 |
| 6,070,493 | A | * | 6/2000 | Chen ........................... 74/594.6 |
| 6,085,614 | A | * | 7/2000 | Lin .............................. 74/594.6 |
| 6,393,940 | B1 | * | 5/2002 | Ueda ........................... 74/594.6 |
| 6,453,771 | B1 | * | 9/2002 | Takahama et al. .......... 74/594.6 |

FOREIGN PATENT DOCUMENTS

JP 03159893 A * 7/1991 ............ B62M/3/08

OTHER PUBLICATIONS

PD-M324, 2001, author: Shimano American, title: Multi-purpose Pedal.

* cited by examiner

Primary Examiner—David A. Bucci
Assistant Examiner—Timothy McAnulty

(57) ABSTRACT

A bicycle pedal having relative height variability between a clipless binding designed to engage a cleat recessed within a shoe sole, and a shoe supporting surface surrounding this binding, on both sides of the pedal. The relative height is sufficiently variable to allow the pedal to be used in either clipless binding operation or in unbound operation, on one or both sides of the pedal, respectively. The setting of the relative height between the bindings and the shoe supporting surfaces is effected on both sides of the pedal simultaneously, upon a single actuation by the cyclist. In addition, the cyclist may set the pedal to automatically change to unbound mode upon the release of the shoe cleat from the binding.

15 Claims, 20 Drawing Sheets

CONVERTIBLE CLIPLESS BINDING/UNBOUND BICYCLE PEDAL

CROSS-REFERENCES TO RELATED APPLICATIONS

Not applicable.

BACKGROUND

1. Field of Invention

This invention relates to foot operated pedals for human powered machinery, more specifically to bicycle pedals, both clipless binding pedals where the shoe is attached to the pedal, and platform or cage type pedals, where the shoe is unattached to the pedal (unbound).

2. Prior Art

Bicycle pedals traditionally have supported the cyclist's feet on a platform which could either be an essentially large flat surface, or the edges of two transverse rails, more commonly known as cages. These pedals are most commonly used in what is called here an unbound mode, operation, or style, where the shoe is not attached to the pedal with any type of binding, clip, or strap. This allows the use of almost any type of shoe to be worn while riding the bicycle and requires a minimum of skill and encumbrance to operate the pedals. Many types of bicycle riding, including some types of racing, are also performed using unbound style pedals, where there is a significant chance the cyclist might fall off the bicycle, and/or where a high degree of handling skill and balance is required. Pedals for this type of riding have evolved to provide large shoe contacting areas and highly efficient sole gripping surfaces. In addition, the shoe contacting surfaces on some pedals are slightly curved to better fit the natural curvature of the front part of the sole, for better security from slipping and for more comfort. In certain types of riding, such as freestyle, or observed trials, the bottom side of the pedal, opposite the cyclist's foot is sometimes used to rest on a stationary object, such as a curb, log, rock, etc.

The platform pedal, especially the cage style pedal, has long been modified to provide an attachment of the cyclist's shoe to the pedal. The most common type of attachment prevalent today is still the toeclip and toestrap. The toeclip is a metal or plastic strip which extends forward from the pedal, under the toes, curving up in front of the toes, and then rearwards over the top of the cyclist's front portion of the foot. A flexible, adjustable loop, called a toestrap, connects the end of this toeclip with the body of the pedal and serves to bind the cyclist's foot to the pedal, a process generally known as "clipping in". This toeclip and toestrap shoe retention system allows the cyclist to pull the pedal rearward through the bottom of the stroke, pull it upward through the rearward part of the pedal stroke, and finally, to push it forward through the top of the stroke, all in addition to the usual downward pushing motion, which is the only propulsive stroke possible without the shoe retention system. This results in more power output and faster speeds. For more secure retention, the rails of the cage style pedal are utilized as part of a cleated shoe retention system for cyclists wearing stiff soled cycling shoes. A transverse grooved block, known as a cleat, is attached to the shoe sole, with the groove engaging the rearward cage rail. When used with a toestrap, this allows a higher force to be transmitted to the pedal through the top and bottom of the pedal stroke, and the groove aligns the shoe to the pedal, to maintain both fore/aft positioning and rotational alignment of the shoe to the pedal.

More recently, alternate means of attaching the sole of the shoe to the pedal have become popular, the generally termed clipless pedal, so named because of the lack of a toeclip and toestrap. This system comprises a binding on the pedal body that engages a binding plate attached to the shoe sole when the cyclist steps onto the pedal, similar to a step-in ski binding. This process is also generally referred to as "clipping in", and the binding plate is also generally referred to as a "cleat". All subsequent references to these two terms in this application pertain to clipless bindings, unless otherwise noted. After clipping in, the cyclist's foot stays attached to the pedal until a typically sideways twisting motion disengages the cleat from the binding. Several recent types of clipless binding systems for off-road bicycle usage have been designed which feature a small cleat fully recessed into the sole of the cycling shoe which then allows walking without contact of the cleat with the ground. This allows the rubber sole of the shoe to provide better traction on the ground, reducing slippage, and eliminates the marring of floor surfaces by the cleat, which is typically made from metal. These clipless shoe binding systems featuring recessed cleats have become very popular since their introduction around 1990, and though originally developed for off-road bicycle usage, they have also become popular for road cycling as well, as all cyclists wearing cleated cycling shoes must walk in them, even if only to get on and off the bicycle.

Advantages of the newer clipless binding systems, especially those with shoe recessed cleats, include the ability to have bindings on both sides of the pedal, unlike the older cage and toeclip system. This makes it easier for the cyclist to clip in to the bindings. The cyclist does not have to spin the pedal around to find the correct side. Other types of clipless pedals having only a single binding are counterweighted so that the correct side comes up automatically, however bearing friction, grease viscosity, and seal friction, all of which can be dependent on temperature, wear, adjustment, and the presence of dirt or water, tend to make this method of pedal alignment unreliable. If the pedal spins freely enough to assure that the counterweight reliably rotates the pedal, the cyclist often "overspins" the pedal inadvertently.

Both the traditional toeclip type pedal and all of the new clipless binding type pedals do not allow safe and comfortable unbound mode usage on both sides of the pedal while wearing a shoe with a cleat designed to engage the clipless binding(s). Nagano, U.S. Pat. No. 5,003,841 (1991) shows a pedal with both shoe supporting surfaces (cages), and clipless bindings on both sides of the pedal. The binding cleats for use with this pedal are large and protrude substantially downward from the shoe sole, having the disadvantage of not being recessed into the sole of the shoe sufficiently to allow comfortable and safe walking or cycling in unbound mode. This pedal does, however, allow the bindings to be sufficiently recessed into the pedal, such that a shoe having a largely smooth or lightly treaded sole, and not having a cleat attached, may be used comfortably and safely in unbound mode.

The clipless pedals designed for shoe recessed cleats and having bindings on both sides of the pedal typically feature small shoe contacting areas that are slippery and not level or smooth. They are uncomfortable and unsafe to ride without wearing a stiff soled cycling shoe with a cleat that is clipped in to the binding. The toeclip pedal has only one toeclip on one side of the pedal, and thus the other side of the pedal can be ridden unbound style, however when this is done, the toeclip and toestrap hang underneath the pedal, close to the ground, and can be unsafe and prone to damage if the toeclip or toestrap snags or drags on the ground.

All of the clipless binding pedals, as well as the older toeclip style pedal have the inherent disadvantage of being difficult to mount and ride in many cycling situations. Clipping into these pedals requires concentration and accurate foot placement. On smooth roads at low uphill, level, or downhill grades, the cyclist can coast momentarily after an initial start and generally has enough time to perform this operation even though it is inconvenient and distracting. However, for medium to high uphill grades, or on difficult off road terrain, the cyclist must begin pedaling immediately after mounting the pedals. The cyclist typically clips into a pedal before mounting the bicycle, but then does not have time or balance to clip into the second pedal, or, if using a pedal with a single binding, to determine which side of the pedal is up, and to spin the pedal if necessary. Often the cyclist must fully come to a stop, straddle the bicycle and try to get clipped in from a standstill. This can be difficult even for an experienced racing cyclist and can result in time loss during a race. For a cyclist riding on busy streets, the distraction of trying to clip into the pedal can be dangerous by diverting the cyclist's attention to traffic, especially at intersections, where many hazards exist.

In many of the conditions where clipping into the pedals is difficult, riding while clipped in is also difficult and unsafe as well. This can include riding over rough terrain where agile body motions, including lifting a foot off a pedal, are required to keep balanced over the bicycle, or when riding in busy traffic, where the cyclist may feel the need to stop suddenly, to jump off the bicycle, or lift it suddenly onto a curb, in response to an impending hazard. The ability to perform agile body motions without the feet being attached to the pedals is the main reason why cyclists performing the sport of observed trials cycling (a form of obstacle course riding over difficult terrain), BMX (bicycle motocross racing) or freestyle (stunt riding at low speed on ramps and found urban objects) bicycle riding typically use unbound style pedals. This is true even though clipless binding pedals might appear to give the cyclist an advantage in hopping the bicycle over obstacles, as is often done in these sports. When encountering difficult terrain, the cyclist using clipless pedals cannot easily lift a foot off the pedal to maintain balance, and thus must often dismount the bicycle to walk it through, whereas they might be able to ride through it if they had unbound style pedals installed. Few cyclists, if any, carry an extra set of pedals and a wrench to change them, when they ride, as these items are heavy, and it is difficult and time consuming to perform this operation.

One manufacturer, Shimano, makes a pedal, model number M-323, which has a clipless binding on one side and a cage on the other side, the cage intended for unbound use only, and not for use with a toeclip and toestrap. This pedal has the advantage that the cyclist may comfortably ride the bicycle regardless of the type of shoe being worn. In addition, the cyclist wearing a shoe with a recessed cleat designed to engage the clipless binding, may ride in either unbound mode or clipped in mode. However, when mounting the pedal, either on the clipless binding side, or on the cage side, the cyclist must still look and/or feel for the side desired, and then spin the pedal one half turn, if necessary, to turn the desired side up. As with the aforementioned toeclip type and single sided clipless binding type pedals, this operation requires practice and concentration to perform smoothly and proficiently, and thus this pedal suffers many of the aforementioned disadvantages of both toeclip type and clipless binding type pedals. In most of the aforementioned situations where clipless and toeclip type pedals are difficult to mount and clip into, the operation of looking and/or feeling for which side is up, then spinning the pedal one half turn to place the cage side up is only marginally less difficult, due to the high probability of overspinning the pedal under the time pressure of mounting the bike and quickly clipping in. In addition, when riding in either mode, the cyclist must perform this operation every time he/she takes their foot off the pedal, as the pedal may spin to place the opposite, undesired side upwards. This problem is most pronounced when riding in unbound style, as the foot comes off the pedal easier, and more frequently. As such this pedal is at a disadvantage compared to conventional unbound type pedals for riding in difficult terrain or in conditions where the cyclist desires to ride in unbound mode while maintaining the ability to lift the foot off the pedal freely.

Nagano, U.S. Pat. No. 5,806,379 (1998) shows a bicycle pedal system having both clipless bindings and unbound type tread surfaces. The preferred embodiment is essentially a clipless binding pedal supplied with separate platform type tread surfaces that attach to the binding using an integrally formed cleat on the underside of the platform surface. This is an obvious solution for providing dual mode clipless or unbound capability on either one or both sides of the pedal. It is difficult to install and remove because the typical cleat engagement force of the binding is necessarily high, to prevent inadvertent cleat release from sideways foot pressure under the full weight of the rider. The tread surfaces must be installed by hand and thus great hand pressure is required to install and remove them, typically beyond the capability of most riders. A lever tool, such as a screwdriver must often be used to remove these platforms from the bindings. An alternative embodiment shows an unbound type pedal, similar to a platform or cage style pedal, that allows the attachment of clipless binding mechanisms, using screw fasteners. This alternative is also difficult to use, by the obvious requirement to separately carry a screwdriver. Both embodiments require the user to separately carry the platform surface or clipless binding attachments plus any tools needed to install them, a clear drawback. Both embodiments also require the user to stop riding in order to attach or detach the platform surface attachments, another clear drawback.

Chen, U.S. Pat. No. 5,916,332 (1999) shows a cage type pedal having a detachable clipless binding for a recessed type cleat mounted on one side of the pedal. This pedal has the advantage of being convertible to unbound mode on both sides of the pedal by removing the clipless binding, which is attached to the pedal with a screw. This pedal, however, has the same disadvantages of the pedal system of Nagano, U.S. Pat. No. 5,806,379 by requiring the rider to stop and dismount the bicycle in order change pedal operation modes, and by requiring the rider to carry either a screwdriver or hex wrench, and to carry the separate clipless binding when operating in unbound mode on both sides of the pedal.

What is needed is a clipless pedal for a recessed type cleat, that can be set or configured to operate as either a unbound pedal on both sides of the pedal, or as a clipless pedal on both sides of the pedal, so that the cyclist does not have to carry separate platform attachments, bindings, screwdrivers, hex wrenches, or other tools in order to change operation modes. Such a pedal would not require the cyclist to determine which side is up when mounting the pedals, and would allow him/her to simply step on the pedals (clipping in to the binding, if using clipless binding mode), and commence pedaling immediately. Furthermore, the mode of operation should be easily and quickly changeable without the need for the cyclist to stop, or even to look down at the pedals while coasting. Another benefit would be that the same set of pedals providing recessed cleat clipless operation would also allow comfortable cycling with any kind of shoe suitable for unbound operation, without the necessity of spinning the pedal to select the desired mode of pedal use. Such a convertible, truly dual mode pedal would eliminate the need to have more than one set of pedals, frequently installing and removing them from the crank arms, a process that eventually damages the pedal threads on the crankarm, or to carry separate platform surfaces or bindings.

There are some recent pedal designs which attempt to provide both unbound and clipless operation on both sides of the pedal, with only limited success. Hanamura, U.S. Pat. No. 5,771,757 (1998) shows a pedal which incorporates clipless bindings on both sides of a pedal body having a large shoe contacting area, with similarities to a cage style pedal, surrounding both clipless bindings. The clipless bindings, however, protrude above the shoe contacting area of the cage at all times. This protrusion of the binding above the shoe supporting surface is necessary to properly engage the shoe cleat that is recessed into the shoe sole. This pedal is designed primarily for off-road downhill use, where the cyclist is usually clipped in, but becomes unexpectedly unclipped and cannot immediately clip back in due to travel at high speeds on rough terrain. Under these circumstances it is helpful to have cages surrounding the bindings to assist the cyclist in locating the pedal, providing a temporary place for the shoe to rest until the cyclist can get clipped back in. Limited propulsive pedaling may be possible without clipping back in, but the clipless binding which protrudes above the shoe supporting surface is slippery against the cleat when not properly engaged. The rider is forced to place his/her foot substantially askew in order to gain a secure foot placement. In addition, the bindings protruding above the shoe supporting surfaces are also slippery and uncomfortable against non cycling shoes without a cleat. Most non-cycling shoes have a relatively compliant sole and the foot feels a concentrated pressure under the small clipless binding. Thus, this pedal does not allow comfortable, safe, or efficient pedaling with any shoe which is not clipped in to the binding; as such, it is not suitable for unbound style riding, except under the temporary and specific conditions it was designed for.

Ueda, U.S. Pat. No. 5,784,931 (1998) shows a clipless bicycle pedal designed to engage a recessed cleat, having a spring loaded, rotatable tread cage surrounding the clipless binding. This design is a variation of the previous design of Hanamura, U.S. Pat. No. 5,771,757, in attempting to provide contact between the tread cage and the shoe sole while the cleat is engaged with the binding mechanism. It is described, though not claimed, as providing a shoe resting surface for a cycling shoe when the cleat cannot be engaged, as encountered during many types of off-road bicycle racing. No figure shows a shoe sole being supported by the cage alone. Under any significant foot pressure, the tread cage will rotate relative to the binding with the result being that the cleat engaging members of the binding protrude substantially above the top of the tread cage. Thus the shoe is supported either on top of, or engaged with the binding. If the shoe is placed on the pedal with the ball of the foot over the pedal spindle axis, only a cleat engaged position will be stable, for if the cleat is not properly engaged with the binding, there is only metal to metal contact between the bottom of the cleat and the top of the binding which is very slippery and insecure. If the shoe is placed on the pedal in a substantially different orientation, so as to avoid contact of the cleat with the binding, then the top surface of the binding contacts the sole of the shoe. Thus, the shoe is supported primarily by the top of the binding, instead of the shoe cage. This is again, a slippery and insecure form of support. Furthermore, this foot position does not allow safe, secure comfortable or and efficient pedaling. In order to have contact between the sole of the shoe and the top of the tread cage, the shoe must be at least substantially tilted to one side or the other, which is again is not safe, secure, comfortable or efficient for pedalling. As such, the cage is not significantly supportive of the rider's foot and cannot provide a stable shoe supporting surface for any type of shoe. As such this pedal cannot be considered a dual mode unbound/clipless pedal; it is a clipless pedal that attempts to provide a temporary surface for the rider to place their foot when terrain and/or speed prevent them from immediately clipping in to the binding. Thus this pedal design is not effective for use in unbound mode, and, like the design of Nagano, U.S. Pat. No. 5,771,757 described above, is intended only to aid the rider in achieving cleat engagement under difficult circumstances. As such, it does not anticipate a bicycle pedal according to this invention, as it does not provide sufficient height variability between a binding and a shoe supporting surface to be comfortably and safely usable in either clipless or unbound mode.

Other pedal designs show height variability between a clipless binding and the pedal body, though not for the purpose of providing both unbound and clipless modes on a single pedal. Ueda, U.S. Pat. No. 6,012,356 (2000) shows a clipless bicycle pedal designed for a flush or recessed shoe cleat having a small amount of height variability between the binding and the pedal body, for the purpose of achieving a slight amount of contact between the portion of the shoe sole laterally surrounding the cleat and the pedal body. This lateral shoe sole contact is claimed to reduce side to side rocking of the shoe when engaged with the cleat. This pedal is designed for clipless operation only, and the pedal body is formed to directly support the shoe sole only at two small areas over the pedal spindle; it does not provide unbound style support over a large shoe sole area. The small amount of height variability acts only on part of the binding and would not be sufficient to fully retract the binding into an platform or cage style pedal body to allow it to be used in an unbound mode.

A desirable modification to the aforementioned desired dual mode clipless/unbound pedal having a choice of either clipless or unbound operation on both pedal sides, which would be useful for riding in steep or difficult terrain, or for riding in busy traffic, would be for the cyclist to be able to preset the pedal to automatically transform to an unbound type pedal on both sides of the pedal, immediately upon the release of the cleat from the binding. This would allow a cyclist wearing cycling shoes with recessed clipless binding cleats to deliberately unclip from the pedal and continue pedaling, uninterrupted, in unbound mode over sections of difficult terrain, or in busy traffic for instance, without having to first unclip, and then reach down to convert the pedal to unbound mode. The conversion operation could be difficult or impossible to perform while coasting the bicycle in these conditions, requiring the rider to stop to make the conversion. This automatic conversion feature thus allows a cyclist to remain riding clipped in, as long as possible, as it eliminates the necessity of predetermining or guessing where the terrain or riding conditions become too difficult to continue riding while being clipped in. Thus, a cyclist could ride while staying clipped in into more difficult terrain than otherwise possible, as the rider would not have to stop to switch the pedals to unbound mode. This would be a decided advantage in off road competitive riding on difficult terrain.

Another useful pedal design for certain types of riding such as observed trials or freestyle, would be a pedal which features a fixed height shoe supporting surface on one side, in combination with a clipless binding and shoe supporting surface on the other side, where the relative height between the binding and shoe supporting surface (on the same side) are sufficiently variable to allow the pedal to be used as an unbound style pedal on both sides, or as an unbound pedal on one side, and a clipless pedal on the other side. This would allow the cyclist to use the downward facing surface to momentarily rest or balance on a log, rock, curb, or other suitable object, as is done in above mentioned sports, while remaining clipped in. The downward facing shoe supporting surface would provide better grip on objects, and be less susceptible to damage than an exposed binding facing downwards. A desirable modification of this design would be to additionally be able to set the pedal to automatically transform to an unbound type pedal on both sides of the pedal, immediately upon the release of the cleat from the binding, as described in the preceding paragraph. Thus, the cyclist can ensure that a shoe supporting surface always faces downward, even after unclipping from the pedal.

SUMMARY

Accordingly, a bicycle pedal according to this invention provides:

A bicycle pedal having both clipless shoe retention mechanisms (bindings) and full load bearing shoe supporting surfaces on each opposing side of the pedal, wherein the relative height between the clipless binding and the shoe supporting surface of each side of the pedal is sufficiently variable, such that the cyclist's shoe either rests and is supported fully on either of the shoe supporting surfaces to provide unbound operation, without the riders shoe being attached to the pedal, or attaches to, via a shoe mounted cleat, either of the bindings to provide clipless binding operation, as desired. The setting of the relative height between the bindings and shoe supporting surfaces is effected on both sides of the pedal, simultaneously, upon a single actuation performed by the cyclist. The setting of the relative height between the bindings and shoe supporting surfaces can be quickly and easily accomplished by the cyclist, without looking down, even while riding (coasting). The cyclist may also set the pedal, while engaged to the binding, to automatically change to unbound mode, on both sides of the pedal simultaneously, immediately upon the release of the shoe cleat from the binding. In a further embodiment, only one side of the pedal features a clipless binding and a shoe supporting surface which are relatively variable in height; the other side of the pedal features a fixed shoe supporting surface only. The aforementioned feature providing automatic change to unbound mode upon shoe release may be combined with this embodiment.

OBJECTS AND ADVANTAGES

Several objects and advantages of the present invention are:

(a) Cyclists retain all the existing advantages of dual sided unbound type pedals, more specifically: cyclists wearing either cycling shoes with recessed clipless cleats, or other suitable shoes not specifically designed for cycling, such as normal street or athletic shoes, can safely and comfortably mount the pedals and ride in an unbound mode without first having to check which side of the pedal is up, and without having to spin the pedal one half turn, if required. This results in less distraction of the cyclist from cycling, allowing safer cycling in difficult terrain or busy environments. The rider is able to pedal over more difficult terrain than is possible when using clipless bindings. This can produce a competitive advantage in many types of off-road bicycle racing, and greatly eases the resumption of uphill cycling from a stop, either on or off-road. The cyclist need not stop to attach separate shoe supporting surfaces to the bindings, or to change pedals in order to have this capability.

(b) The cyclist additionally retains all the existing advantages of dual sided clipless pedals, more specifically: the cyclist, if wearing shoes with clipless cleats, can also mount the bicycle and clip in to bindings on either side of the pedal, without the need to check which side of the pedal is up, and to spin the pedal one half turn, if required, to place a binding upward. The cyclist need not stop to attach separate bindings to an unbound type pedal, such as a platform or cage style pedal, or to remove such pedals from the crankarms, and then install clipless pedals to have this capability.

(c) The cyclist can switch the mode of pedal operation from unbound mode to clipless binding mode or vice versa, quickly and easily, even while riding, without looking down at the pedal. The mode of operation changes on both sides of the pedal simultaneously, upon a single actuation from the cyclist.

(d) By providing an optional setting to provide automatic conversion to unbound mode upon cleat release, the cyclist can ride, if desired, with increased confidence, while clipped in to the binding, through most riding situations which would otherwise be safer to ride through in unbound mode, as the cyclist can immediately change the pedal to unbound mode, by simply releasing [his/her shoes] from the binding. This allows the cyclist to output more energy over rough or difficult terrain, which can provide a competitive advantage in many types of off-road bicycle racing. It can save the cyclist from having to dismount and walk the bicycle through difficult terrain, as this is often the only option for cyclists who ride clipless pedals that do not have a platform or cage type unbound shoe supporting surface on one side of the pedal.

(e) In an optional embodiment providing a fixed shoe supporting surface only on one side of the pedal, and having the aforementioned relative height variability between a clipless binding and a shoe supporting surface on the other side, and in addition, having the automatic conversion feature described in paragraph (d) above, a cyclist may ride through rough terrain while clipped in, and may use the bottom shoe supporting surface facing downward to securely rest momentarily on obstacles such as logs, rocks, or other suitable objects, while maintaining the advantage of having the pedal immediately convert to unbound mode on the top side of the pedal, should the cyclist need to unclip for safety or balance reasons, in situations where the cyclist cannot easily clip back into the pedal. This embodiment can be operated without utilizing the automatic conversion feature of paragraph (d) above, and the cyclist still has the advantage of a pedal which can function in both clipless and unbound modes, as previous designs allowed, yet retains the additional capability of operating the same pedal in unbound mode on both sides simultaneously, without requiring the cyclist to look or feel for which side of the pedal is up, and to spin it one half turn, if necessary, when operating in this mode, or to stop and attach separate shoe supporting surfaces. This is advantageous for cyclists who desire to ride in unbound style only in certain conditions, such as rough ground, or busy traffic, that make spinning the pedal one half turn difficult and/or unsafe. Some cyclists may not care to have clipless binding capability on both sides of the pedal, as they would choose this mode of operation only under conditions where there is ample time to spin the pedal to place the binding side of the pedal upward. These riders would still prefer to have the unbound mode available on both sides of the pedal, of course. Such a pedal will be lighter and less expensive due to the elimination of one of the bindings.

LIST OF FIGURES—PREFERRED EMBODIMENT

Figure 1A:
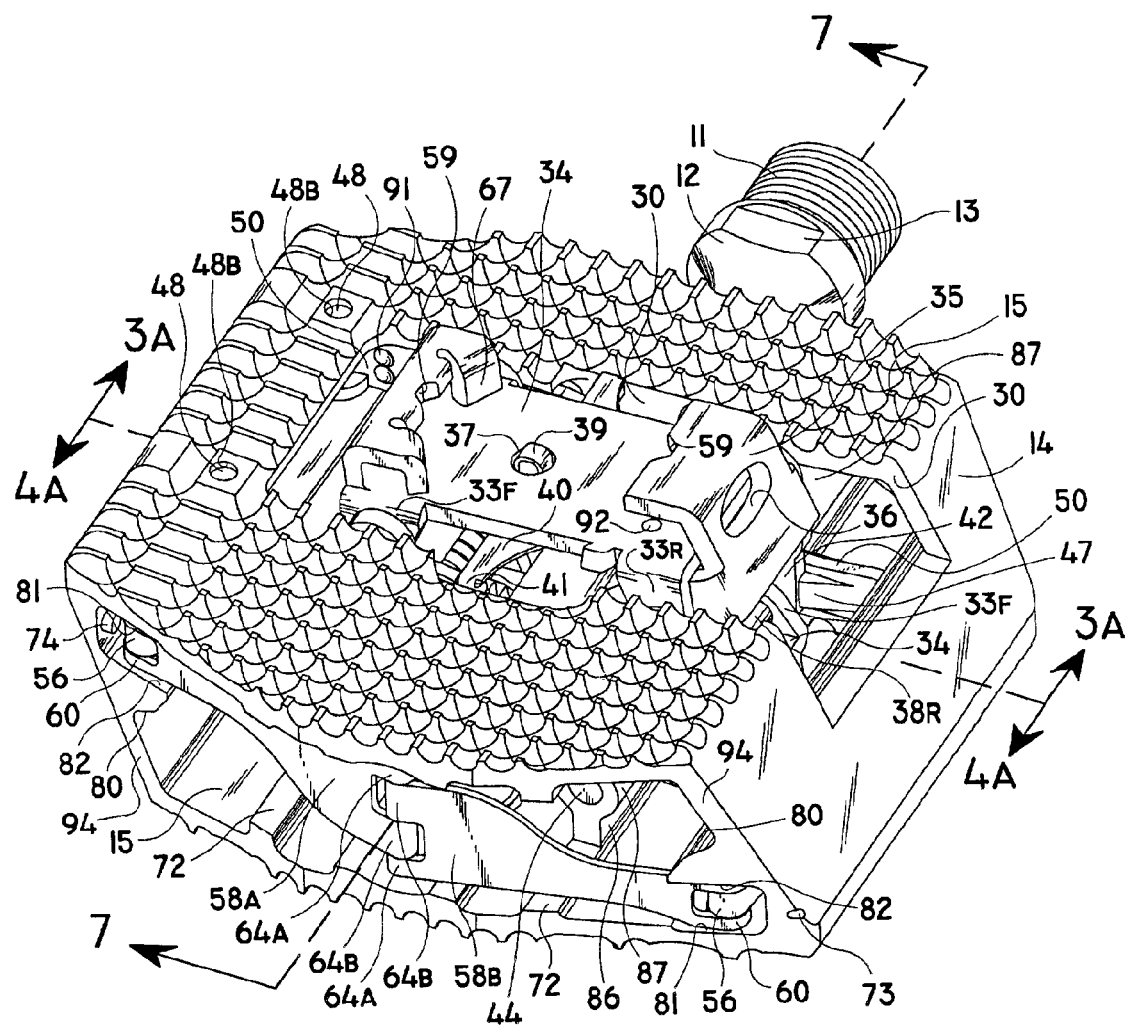
FIG. 1A is an oblique view of the preferred embodiment of a bicycle pedal according to this invention showing bindings extended outward from the pedal body for use as a clipless binding pedal.
Figure 1B:
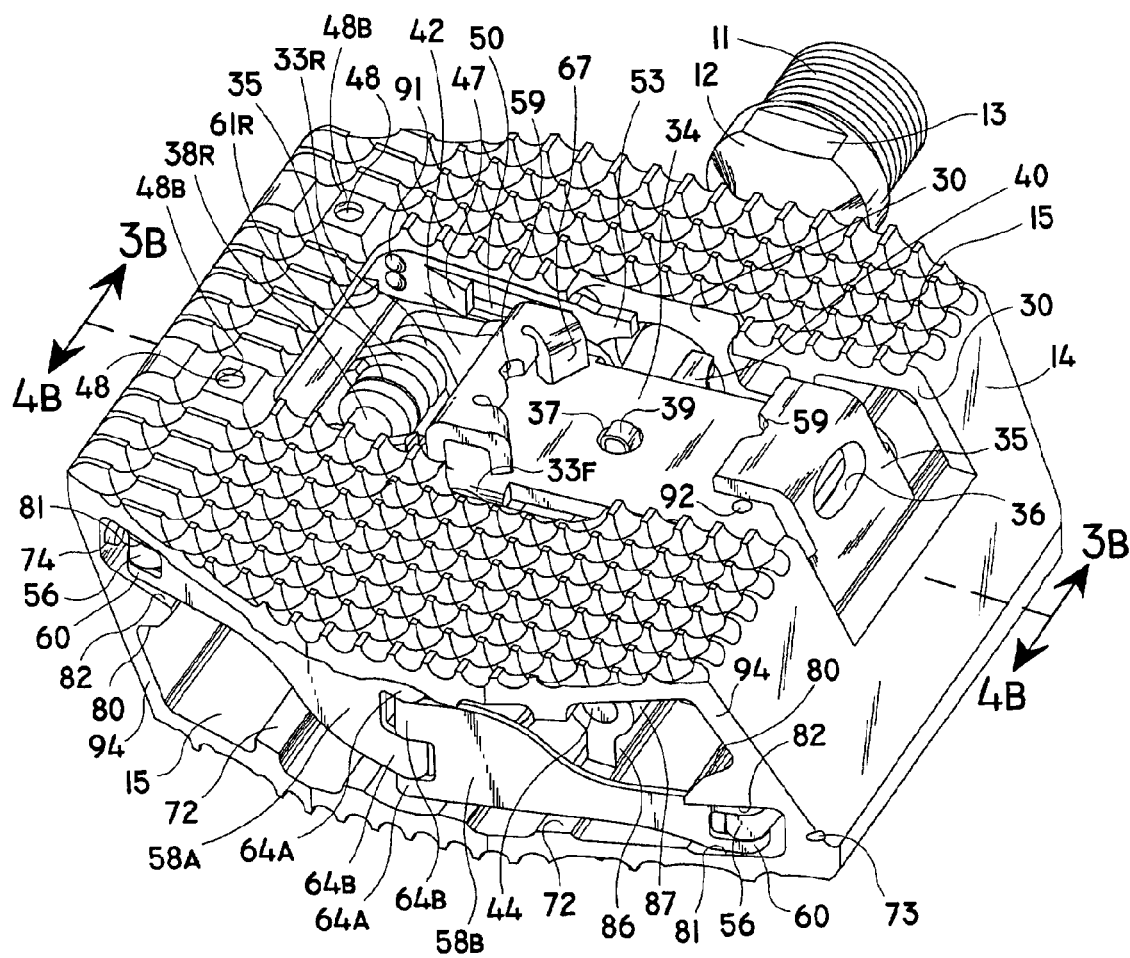
FIG. 1B is an oblique view of the preferred embodiment of a bicycle pedal according to this invention showing bindings retracted into the pedal body, for use as an unbound style pedal.
Figure 2:
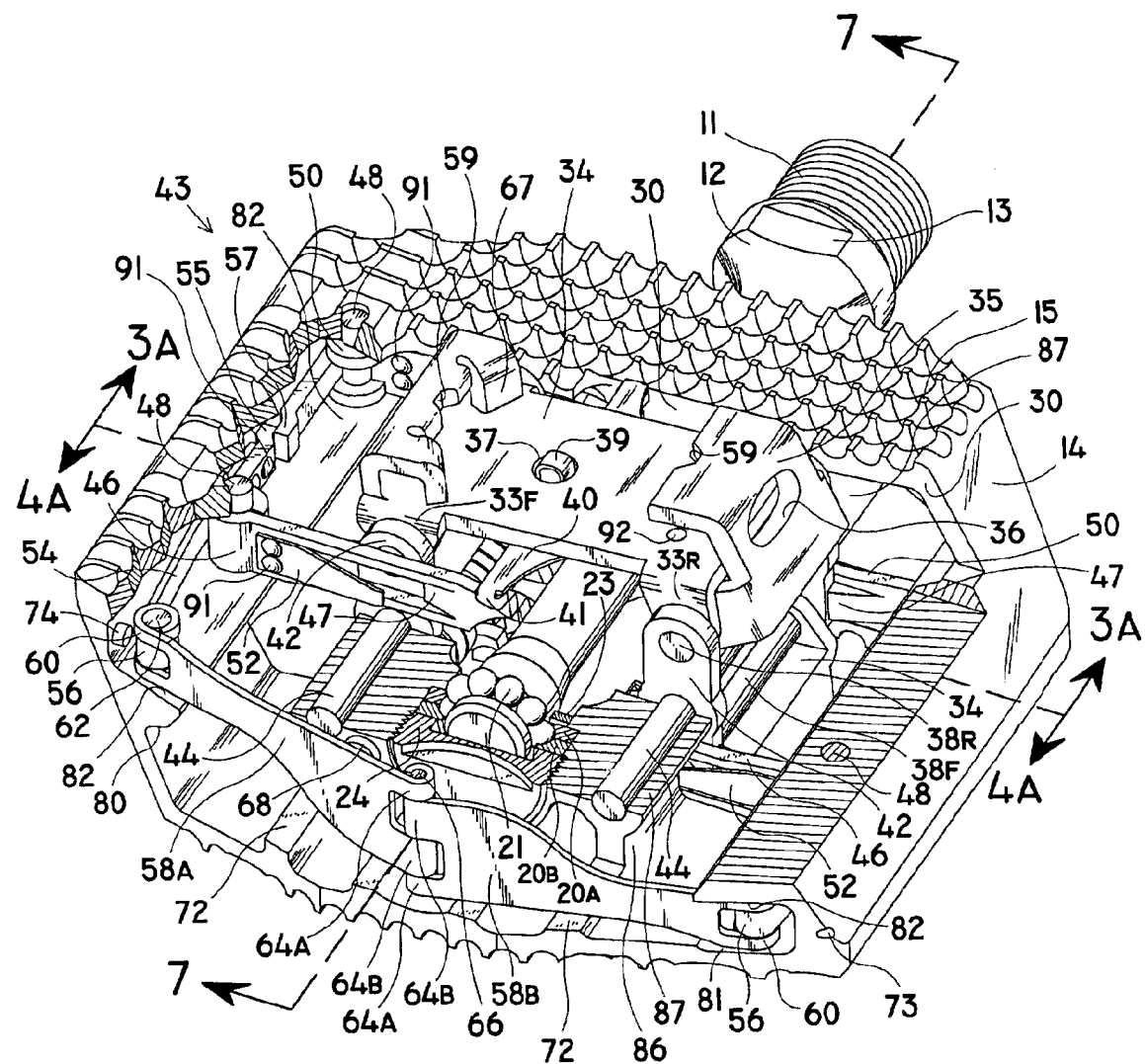
FIG. 2 is an oblique view of the preferred embodiment of a bicycle pedal according to this invention, with a partial section and cutaway showing internal details, with clipless bindings extended.
Figure 3A:
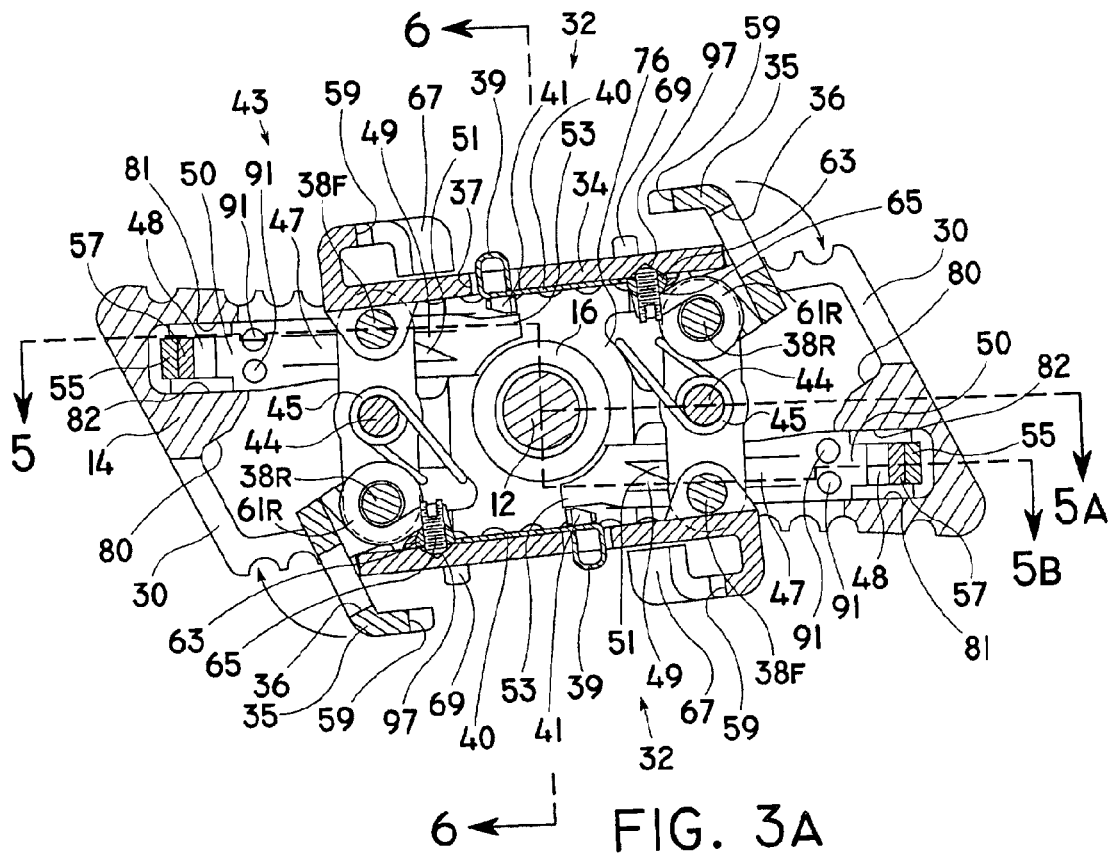
FIG. 3A is a sectional side view of the preferred embodiment of a bicycle pedal according to this invention, as indicated by section lines 3A—3A on FIGS. 1A and 2, with the clipless bindings extended.
Figure 3B:
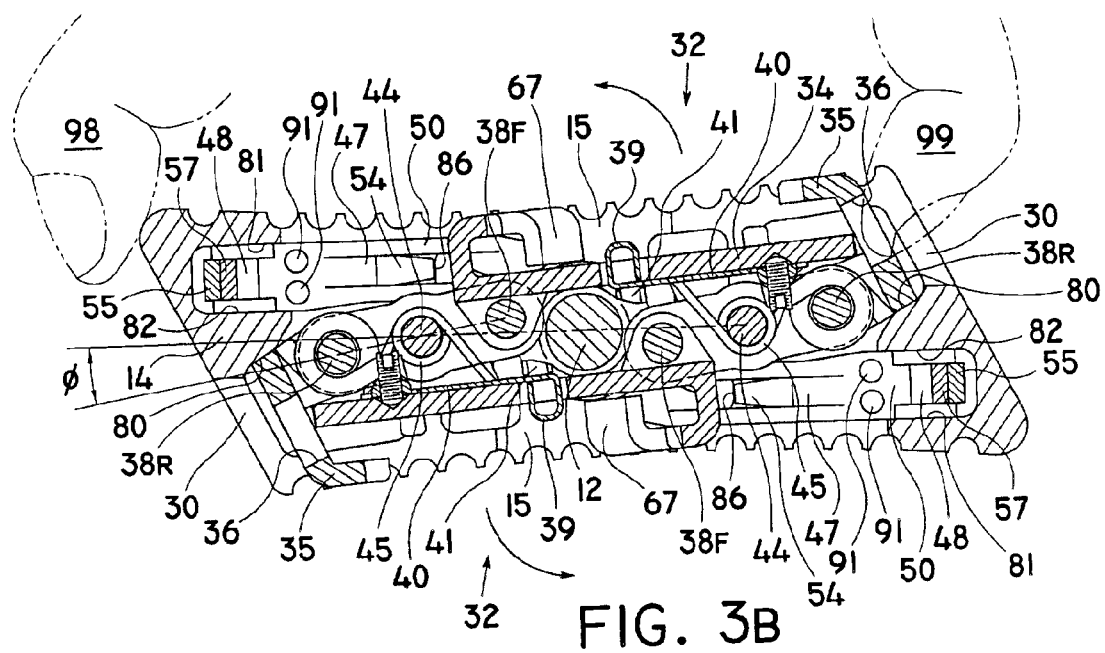
FIG. 3B is a sectional side view of the preferred embodiment of a bicycle pedal according to this invention, as indicated by section lines 3B—3B in FIG. 1B, with the clipless bindings retracted.
Figure 3C:
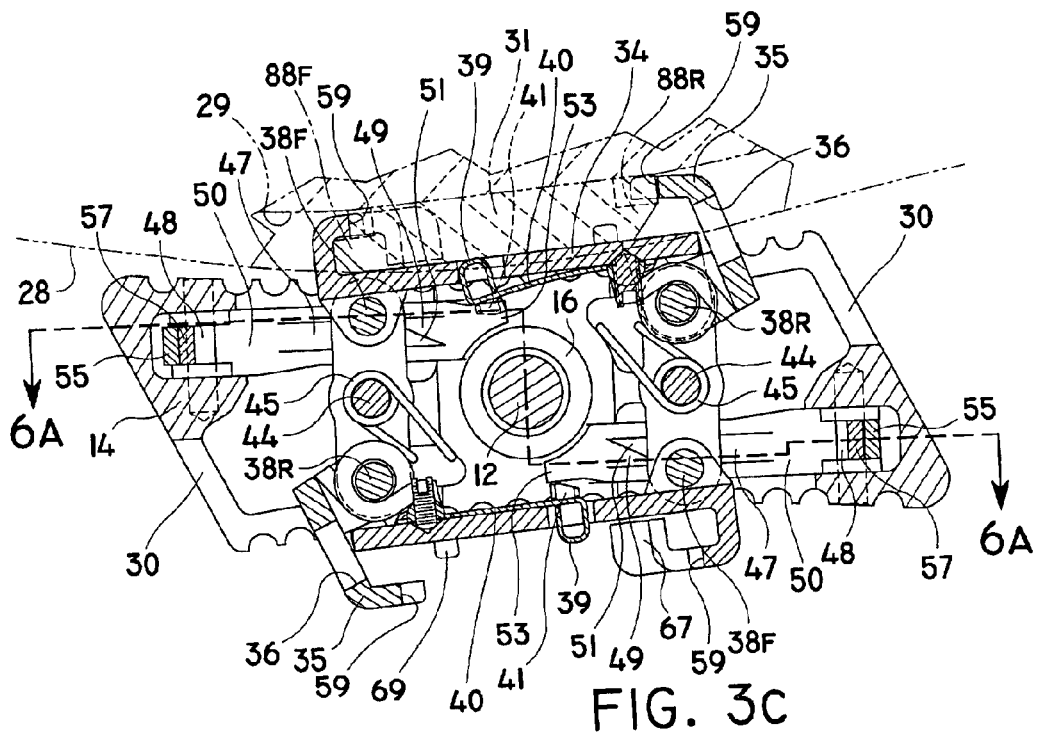
Figure 3D:
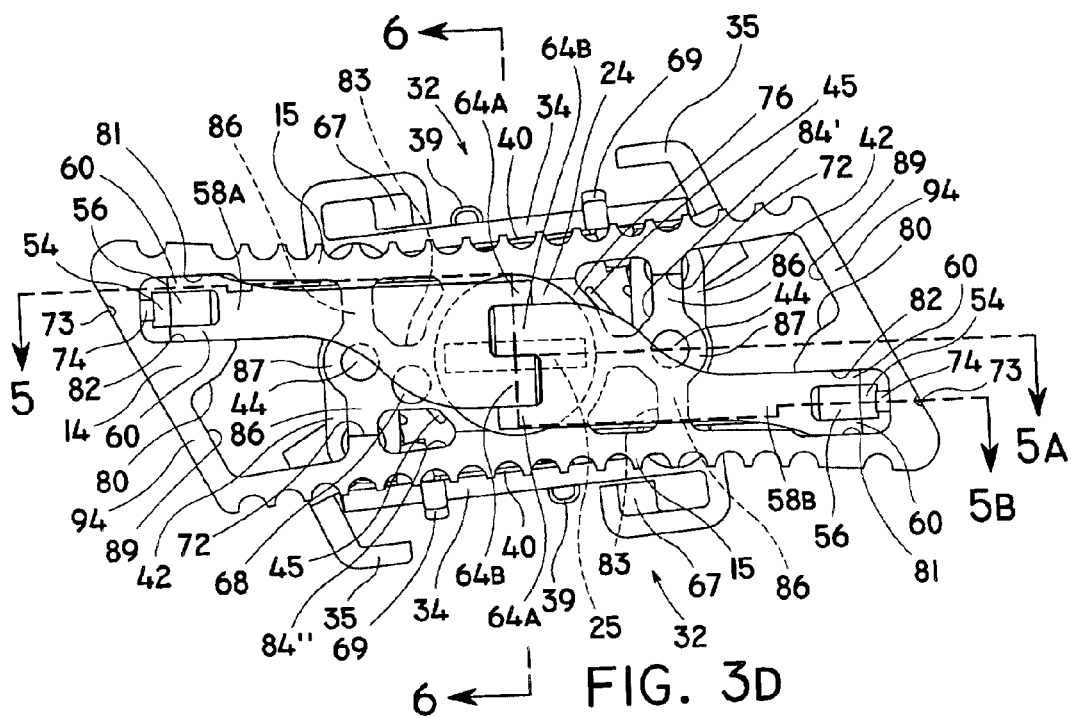

FIG. 3C is a sectional side view of the preferred embodiment of a bicycle pedal according to this invention, as indicated by section lines 3A—3A in FIG. 1B and FIG. 2, but with the clipless bindings engaged FIG. 3D is a side view of the preferred embodiment of a bicycle pedal according to this invention, with bindings extended outward from pedal body, as viewed in the same direction as section lines 3A—3A, in FIGS. 1A and 2.

Figure 4A:
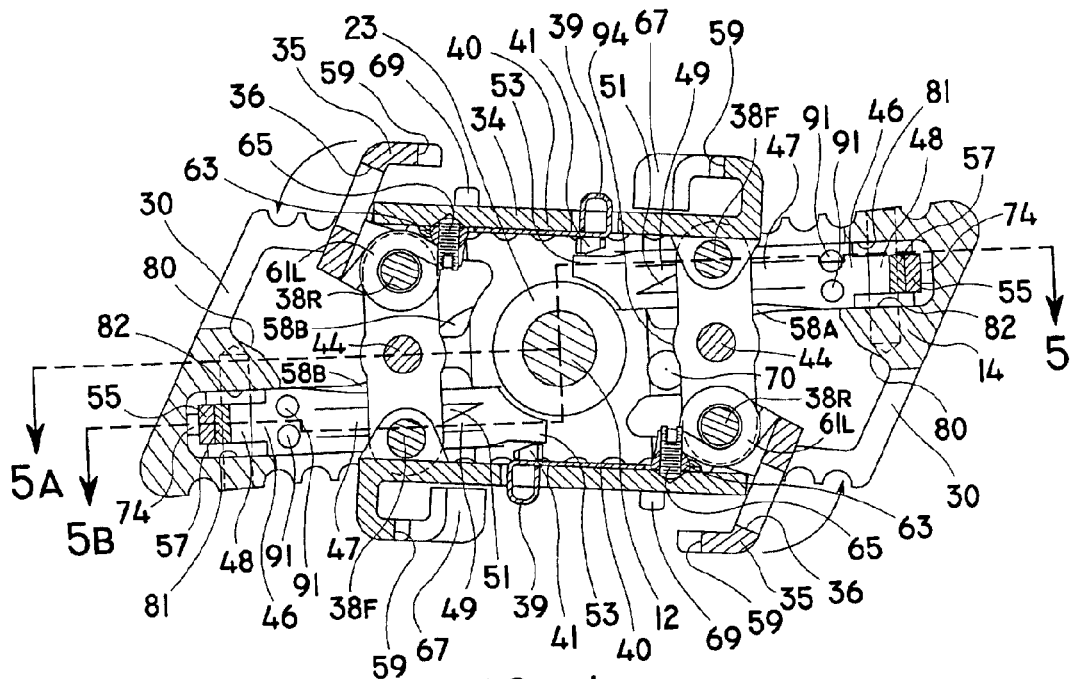

FIG. 4A is a sectional side view of the preferred embodiment of a bicycle pedal according to this invention, as indicated by section lines 4A—4A in FIGS. 1A and 2.

Figure 4B:
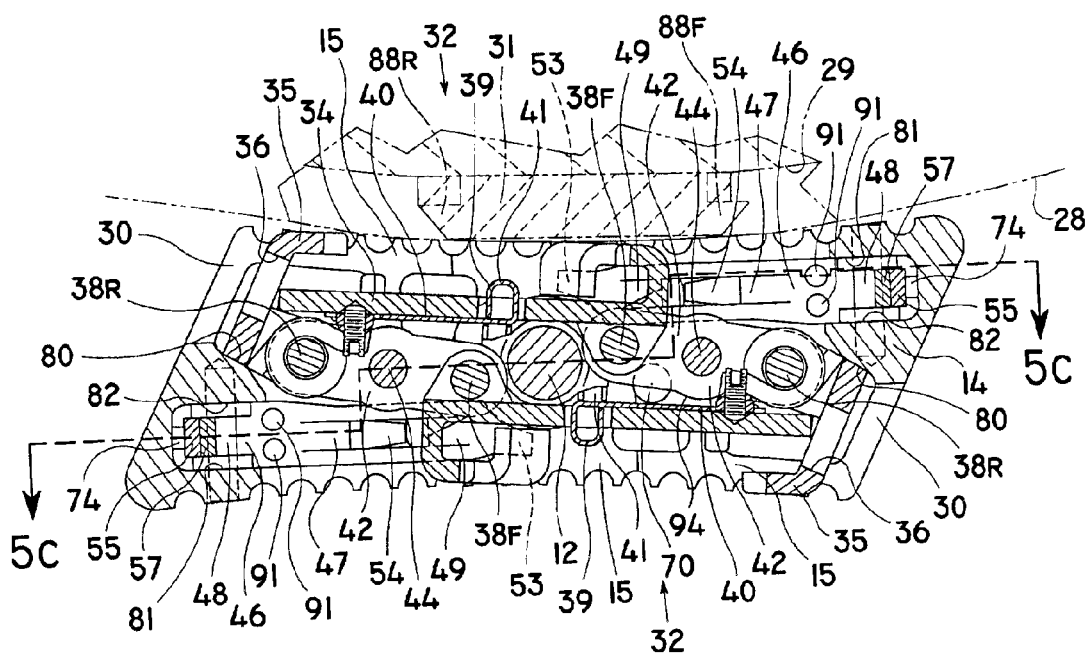

FIG. 4B is a sectional side view of the preferred embodiment of a bicycle pedal according to this invention, as indicated by section lines 4B—4B in FIG. 1B.

Figure 5A:
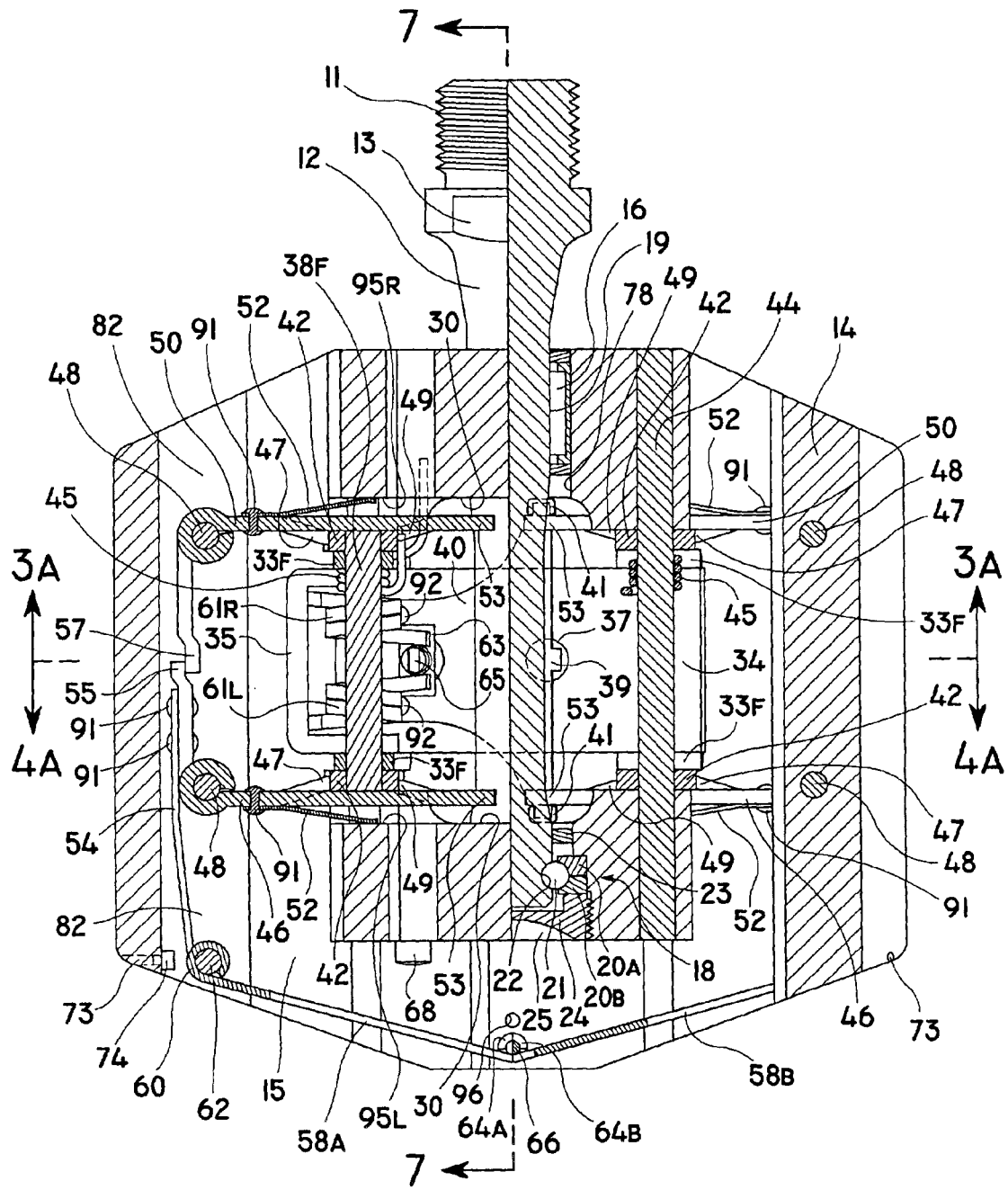

FIG. 5A is a sectional top view of the preferred embodiment of a bicycle pedal according to this invention, as indicated by section lines 5-5A in FIGS. 3A, 3D, and 4A.

Figure 5B:
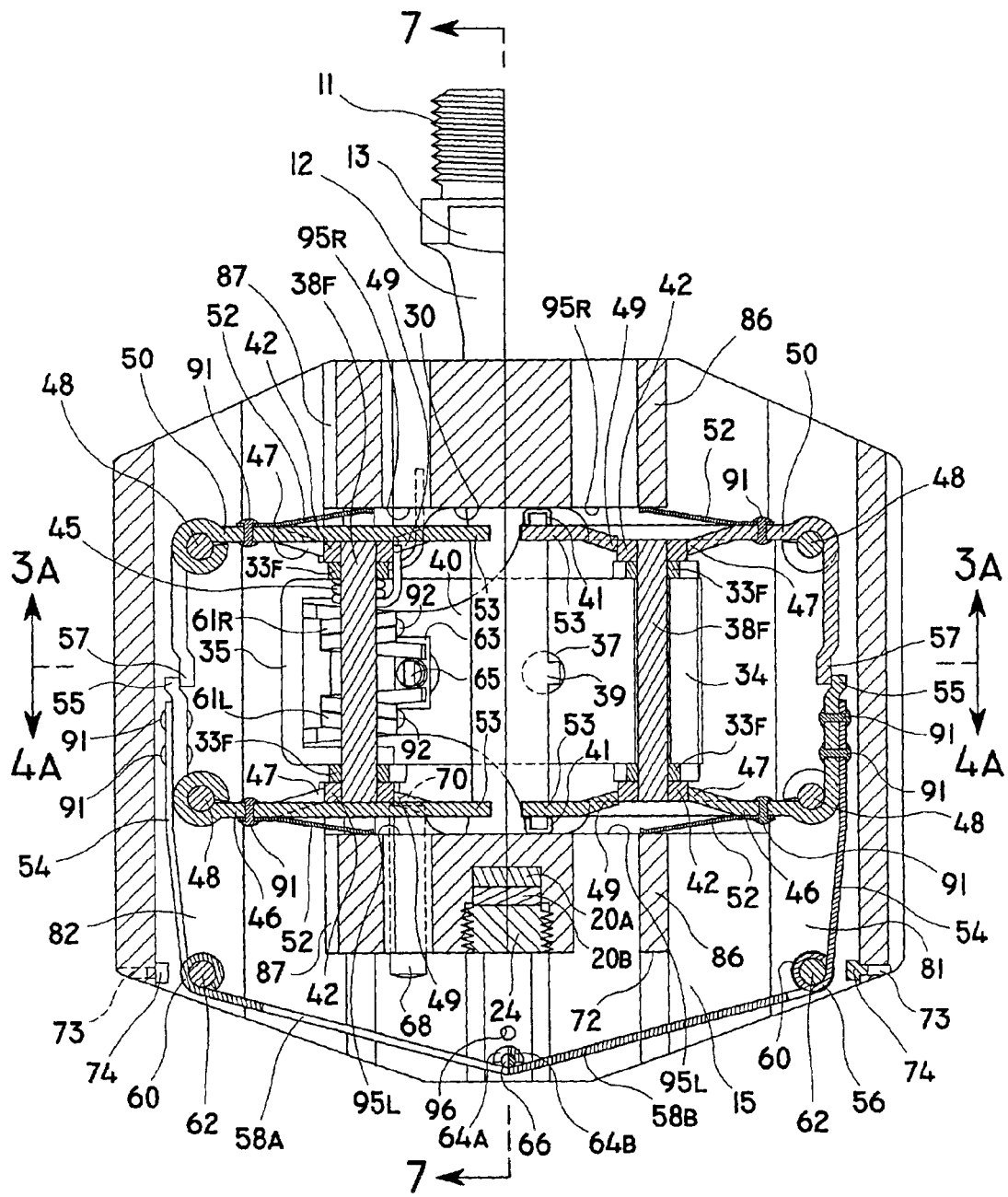

FIG. 5B is a sectional top view of the preferred embodiment of a bicycle pedal according to this invention, as indicated by section lines 5-5B in FIGS. 3A, 3D, and 4A.

Figure 5C:
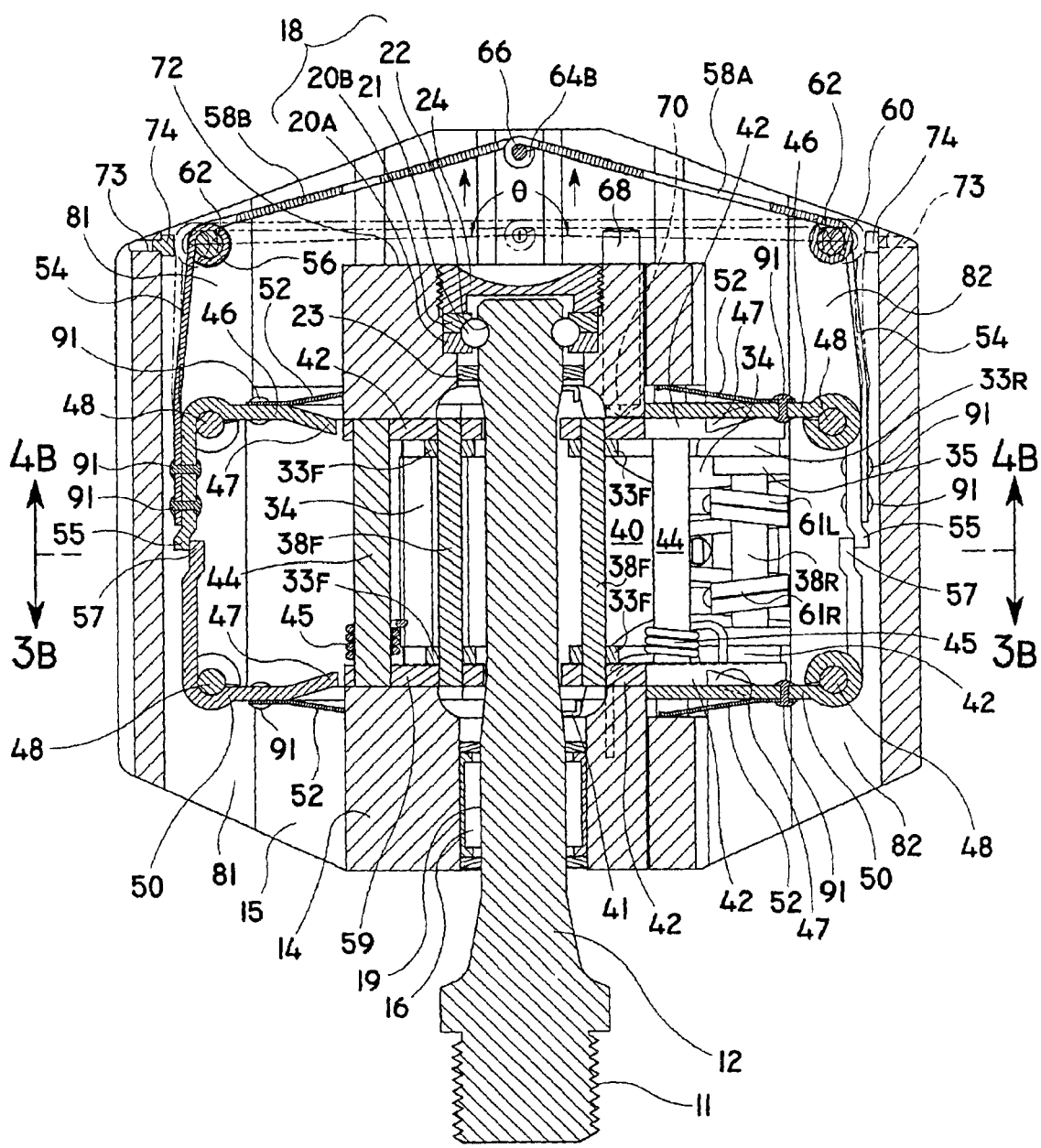

FIG. 5C is a sectional top view of the preferred embodiment of a bicycle pedal according to this invention, as indicated by section lines 5C—5C in FIG. 4B.

Figure 6A:
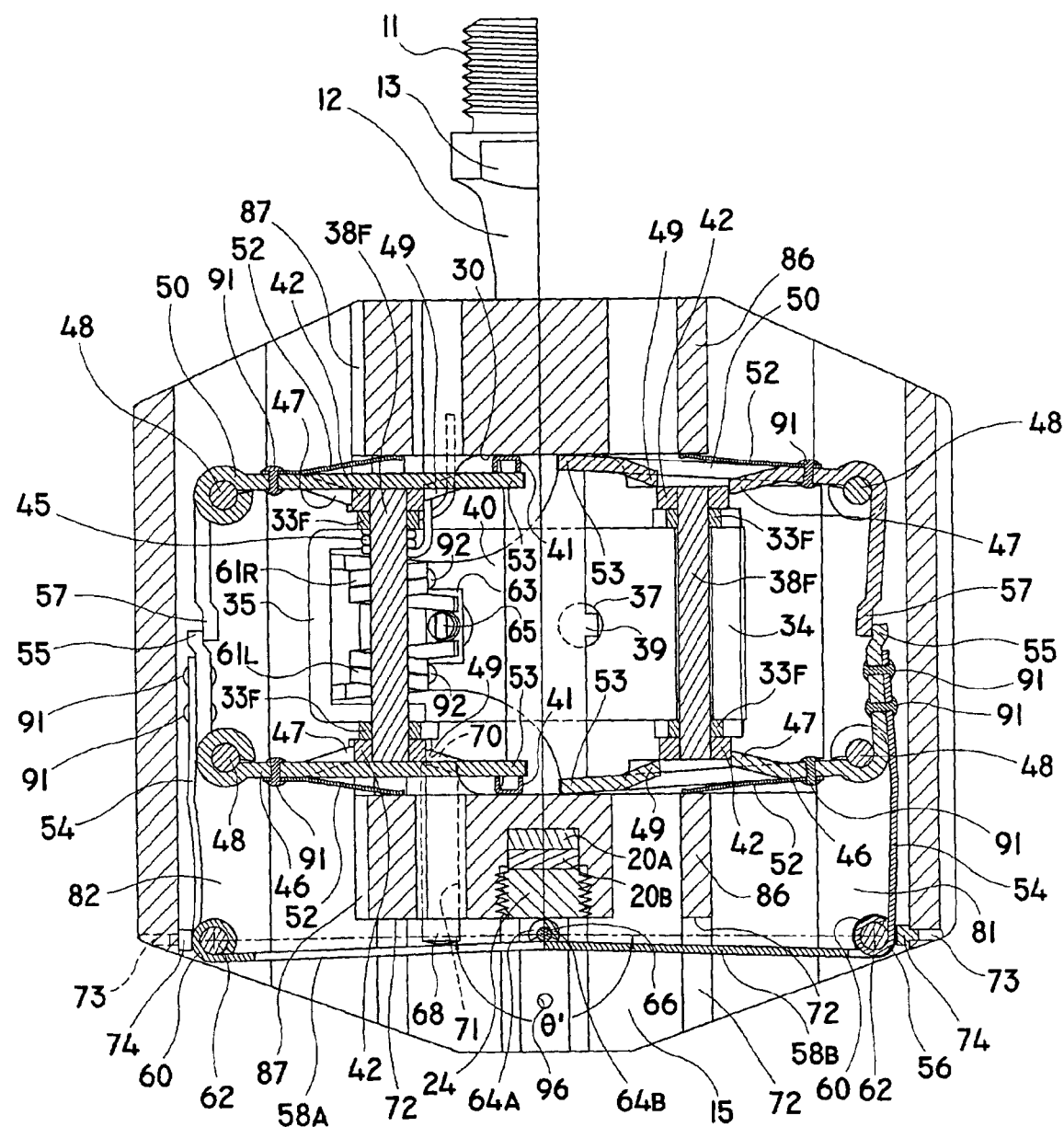

FIG. 6A is a sectional top view of the preferred embodiment of a bicycle pedal according to this invention, as indicated by section lines 6A—6A in FIG. 3C, showing the bindings in a pre-retracted mode of operation.

Figure 6B:
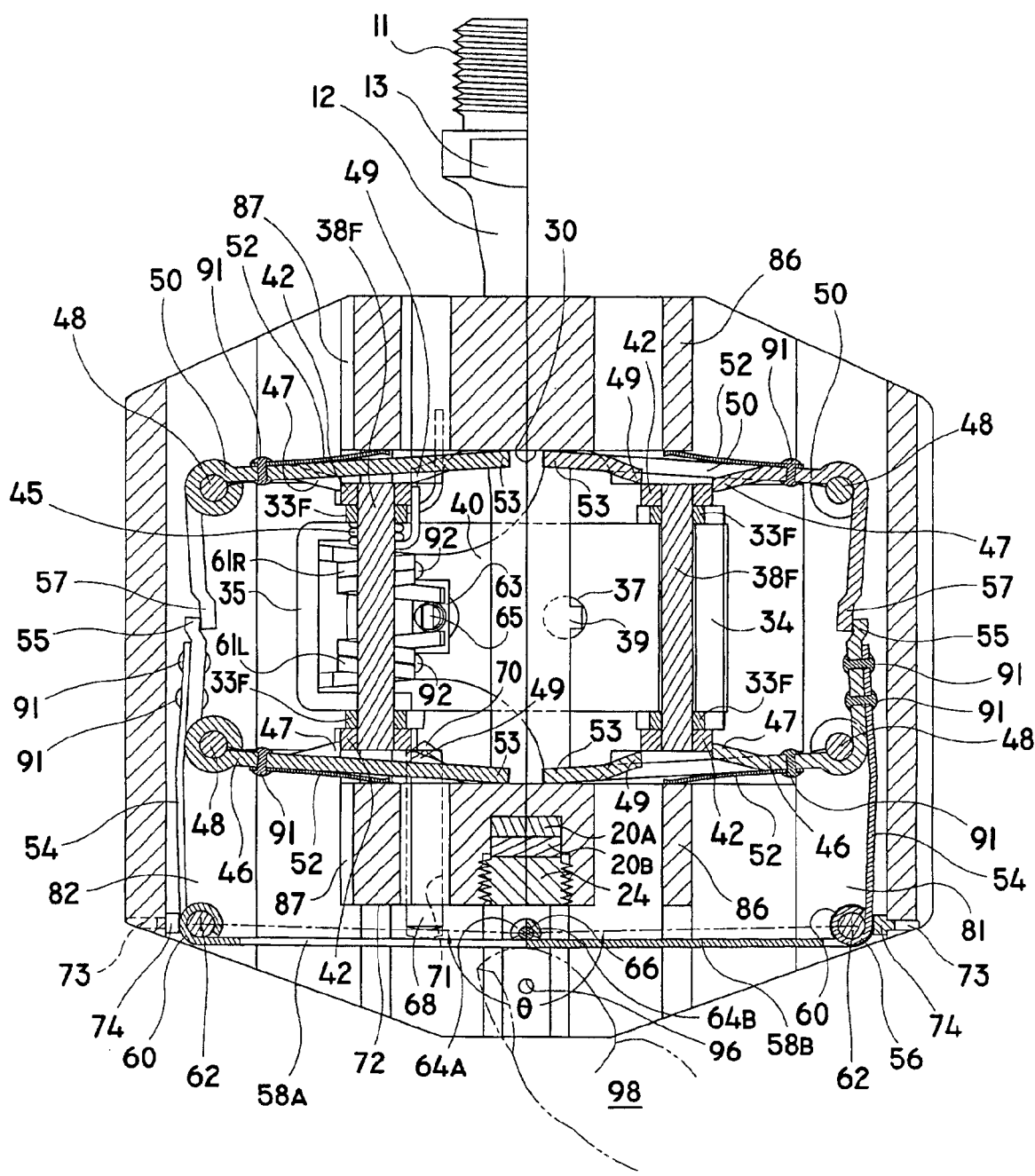

FIG. 6B is a sectional top view of the preferred embodiment of a bicycle pedal according to this invention, as indicated by section lines 5-5B in FIGS. 3A, 3D, and 4A, showing the bindings being fully released for retraction, but prior to actual retraction.

Figure 7:
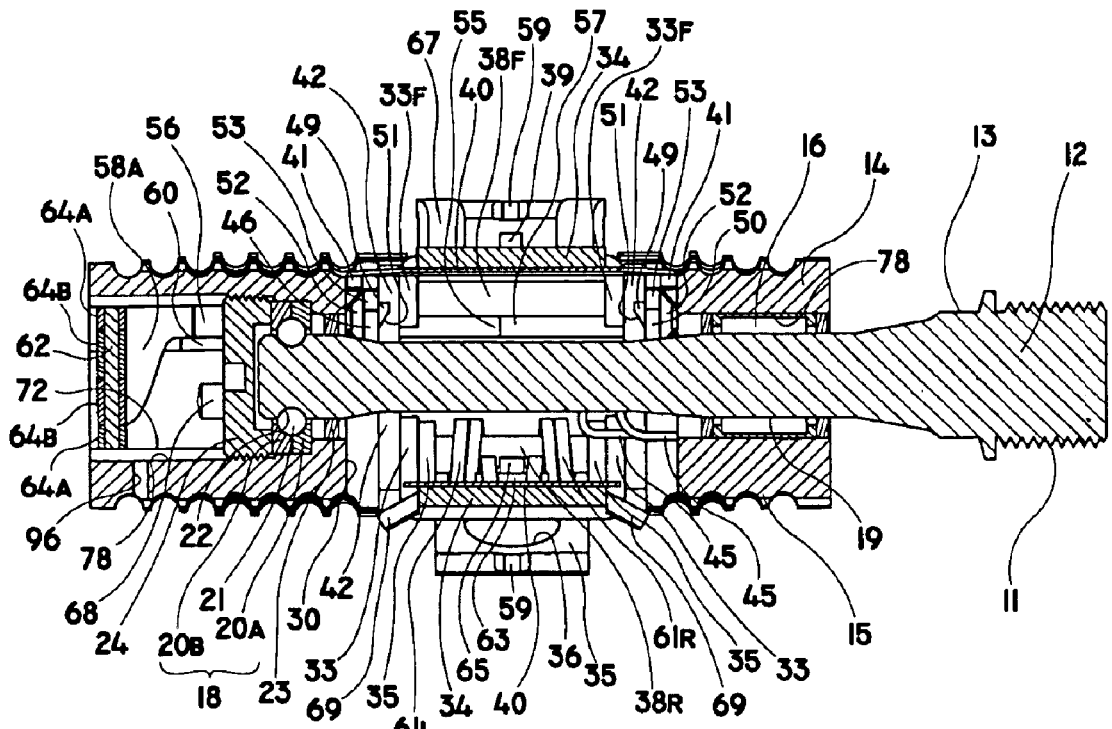

FIG. 7 is a sectional end view of the preferred embodiment of a bicycle pedal according to this invention, as indicated by section lines 7—7 in FIGS. 1A, 2, 5A, and 5B.

Figure 8:
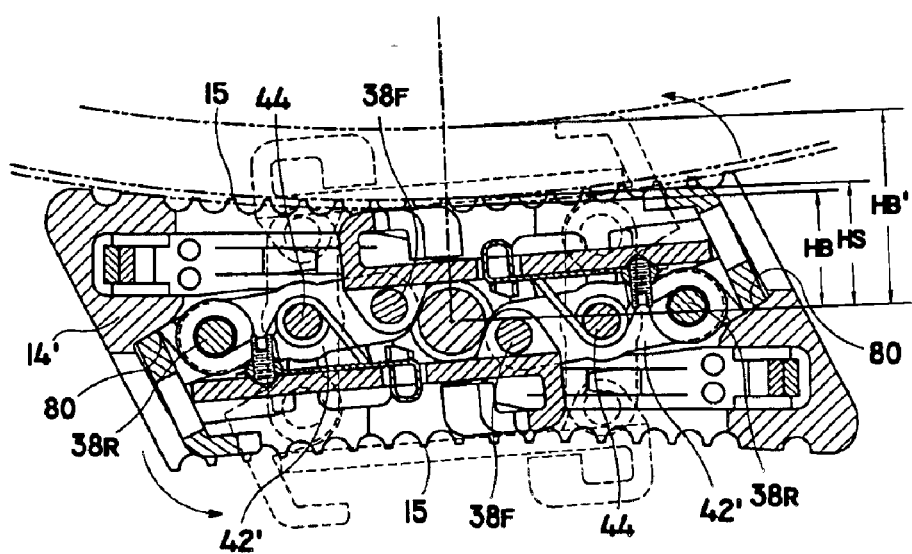

FIG. 8 is sectional side view of an alternative embodiment of a bicycle pedal according to this invention, as indicated by section lines 3A—3A on FIG. 1A, closely related to the preferred embodiment, but featuring bindings which retract further into pedal body.

Figure 9:
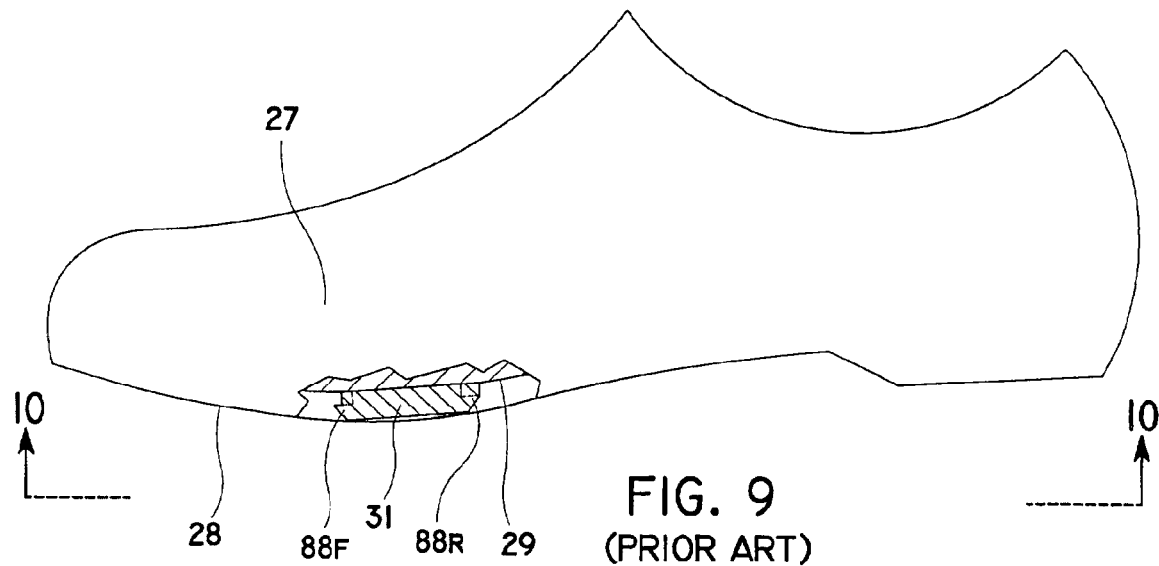
Figure 10:
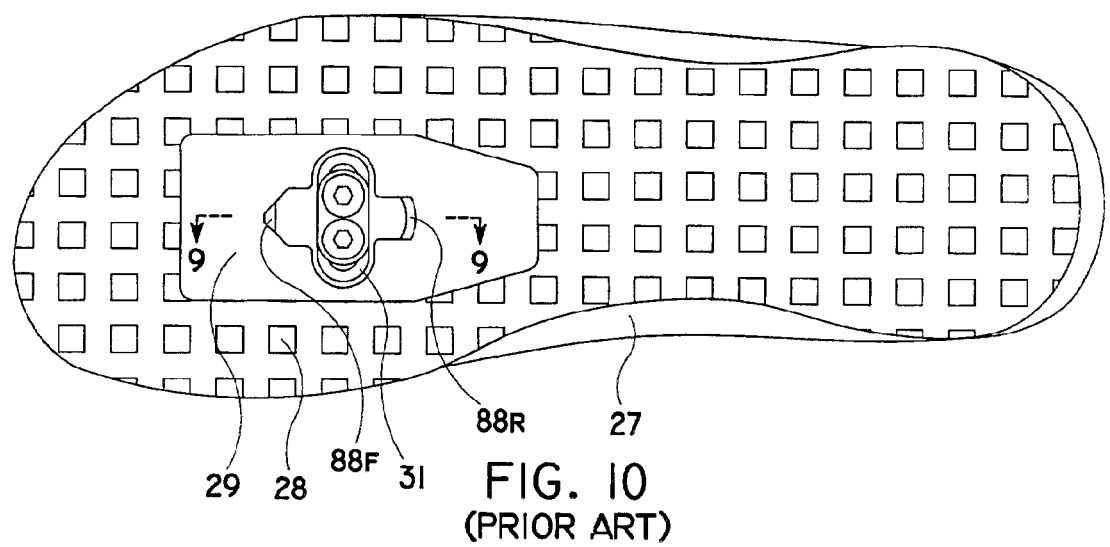

FIG. 9 is a side view, with a partial section as indicated in FIG. 10, of a prior art shoe and cleat system.

FIG. 10 is a bottom view, as indicated by view arrows in FIG. 9, of a prior art shoe and cleat system.

Figure 11A:
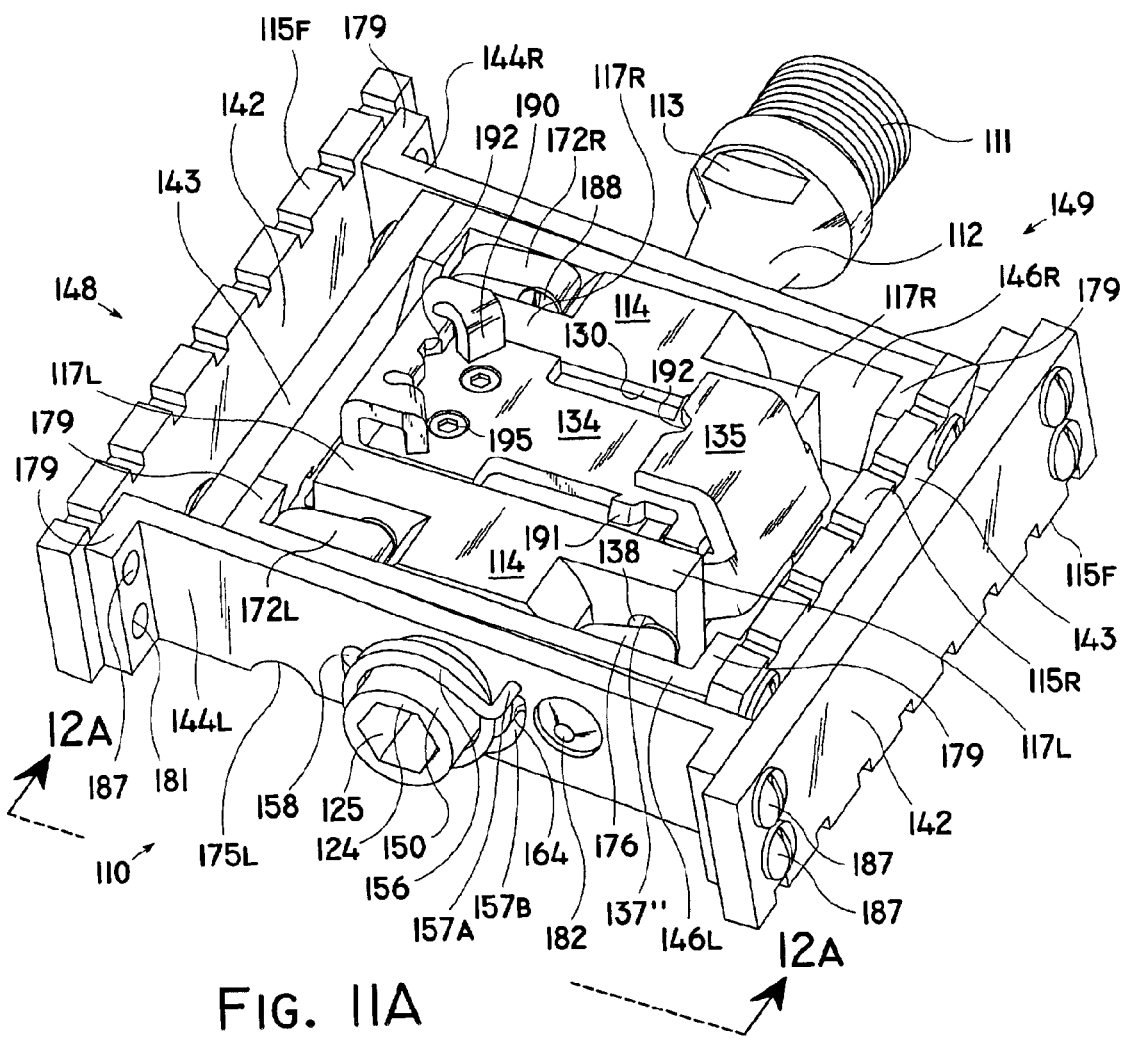

FIG. 11A is an oblique view of an alternative embodiment of a bicycle pedal according to this invention showing shoe-supporting surfaces in a retracted position, for operation in clipless binding mode.

Figure 11B:
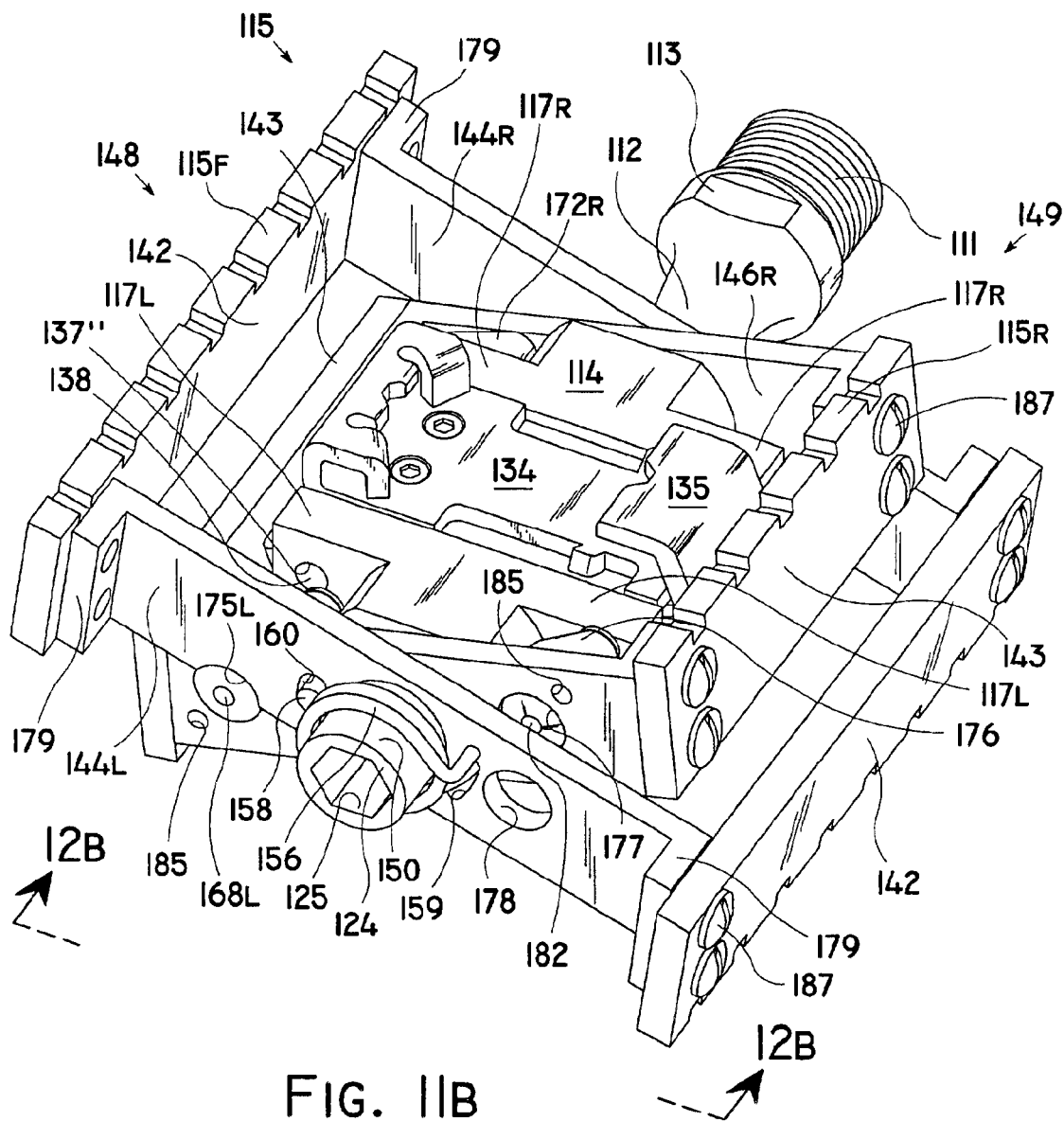

FIG. 11B is an oblique view of an alternative embodiment of a bicycle pedal according to this invention showing shoe-supporting surfaces in an extended position, for operation in unbound mode.

Figure 12A:
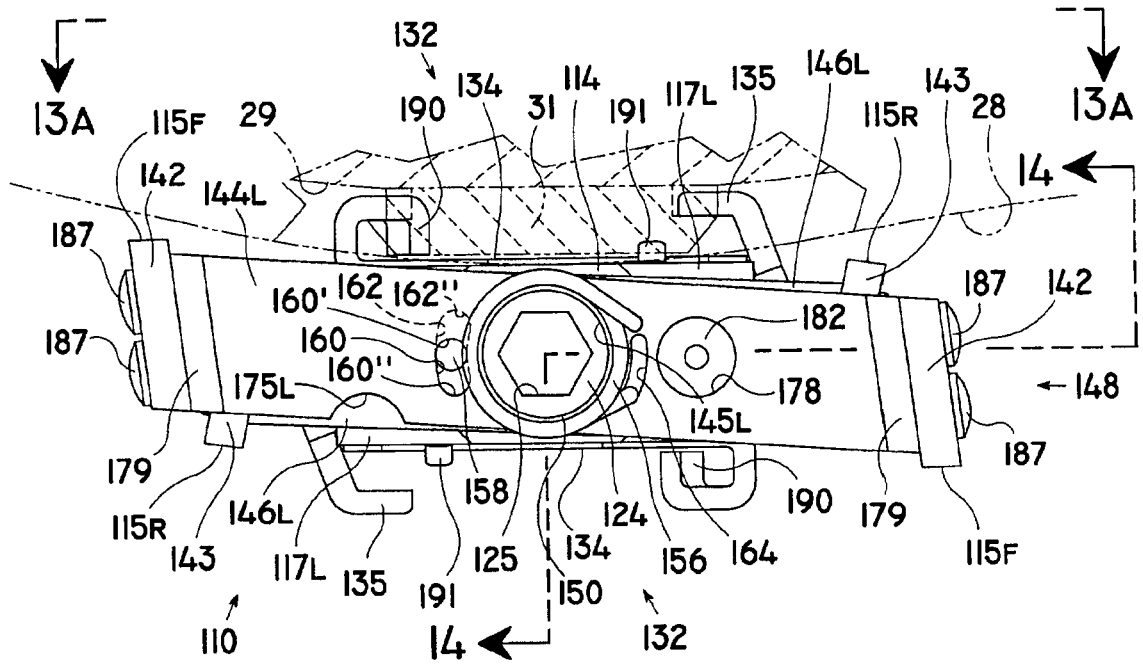

FIG. 12A is a side view of an alternative embodiment of a bicycle pedal according to this invention showing shoe-supporting surfaces in a retracted position, for operation in clipless binding mode.

Figure 12B:
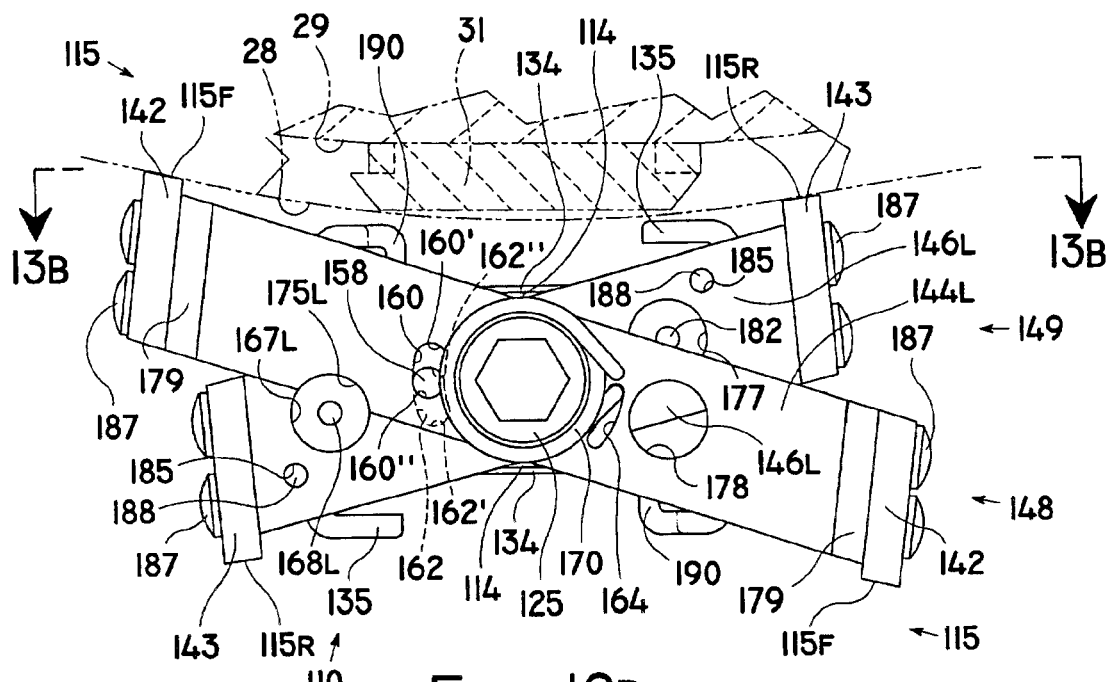

FIG. 12B is a side view of an alternative embodiment of a bicycle pedal according to this invention showing shoe-supporting surfaces in an extended position, for operation in unbound mode.

Figure 12C:
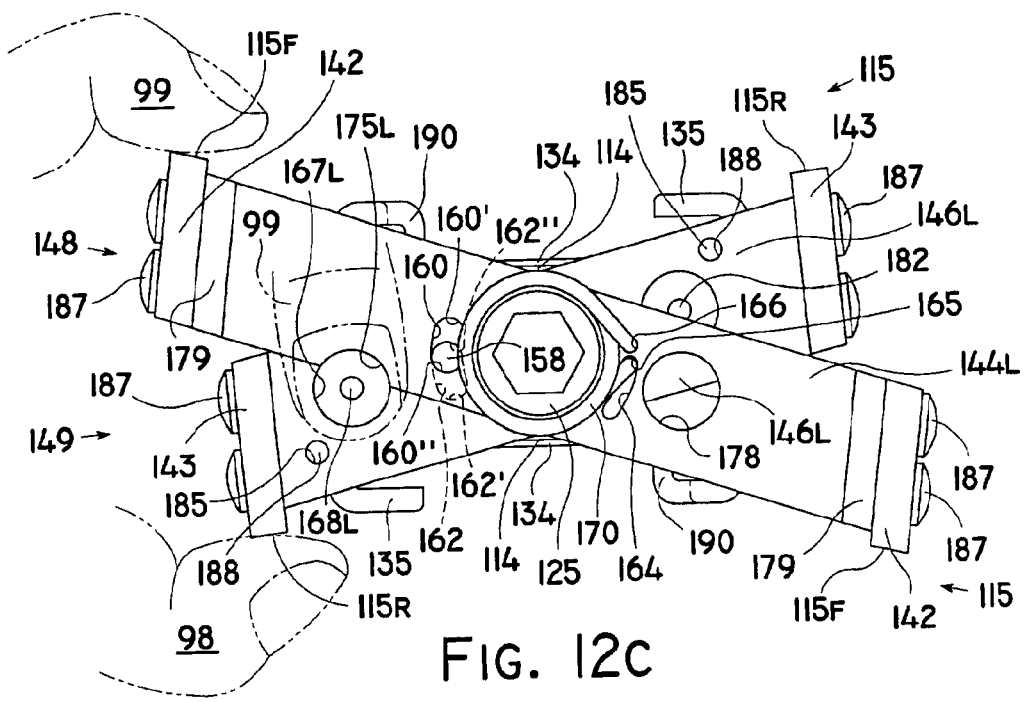

FIG. 12C is a side view of an alternative embodiment of a bicycle pedal according to this invention with shoe-supporting surfaces in an extended position, showing a method for retracting shoe supporting surfaces for conversion to operation in clipless binding mode.

Figure 12D:
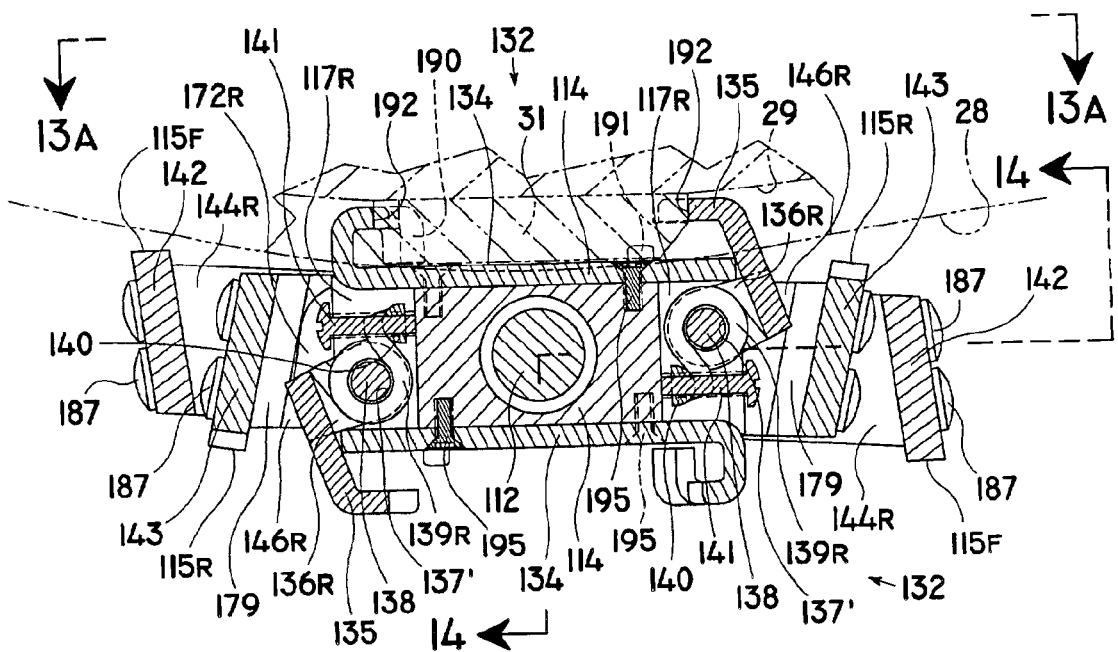

FIG. 12D is a sectional side view of an alternative embodiment of a bicycle pedal according to this invention showing internal details of a cleat engaging binding, for operation in clipless binding mode.

Figure 13A:
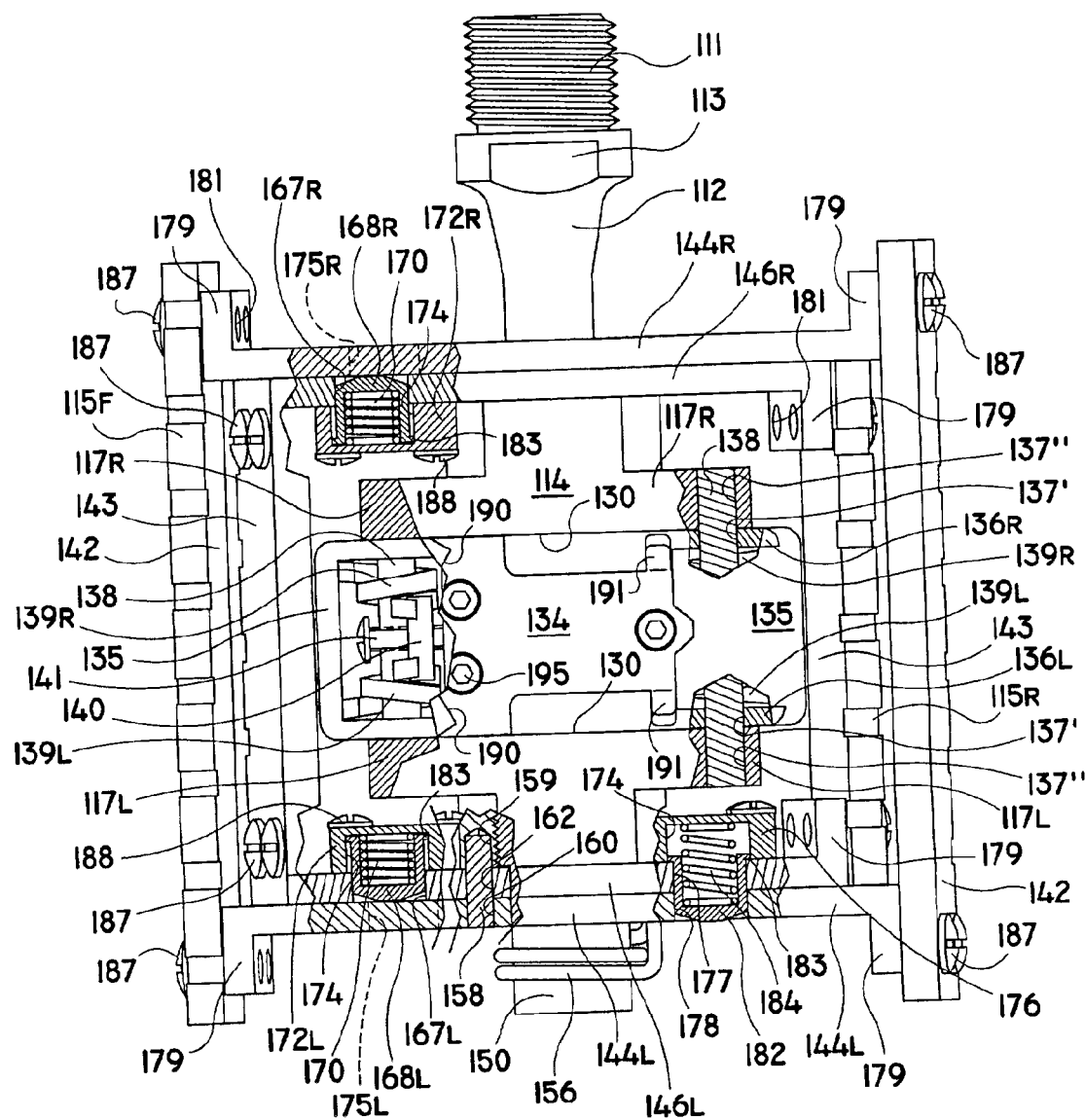

FIG. 13A is an top view, with partial sections showing internal details of an alternative embodiment of a bicycle pedal according to this invention with shoe-supporting surfaces in a retracted position, for operation in clipless binding mode.

Figure 13B:
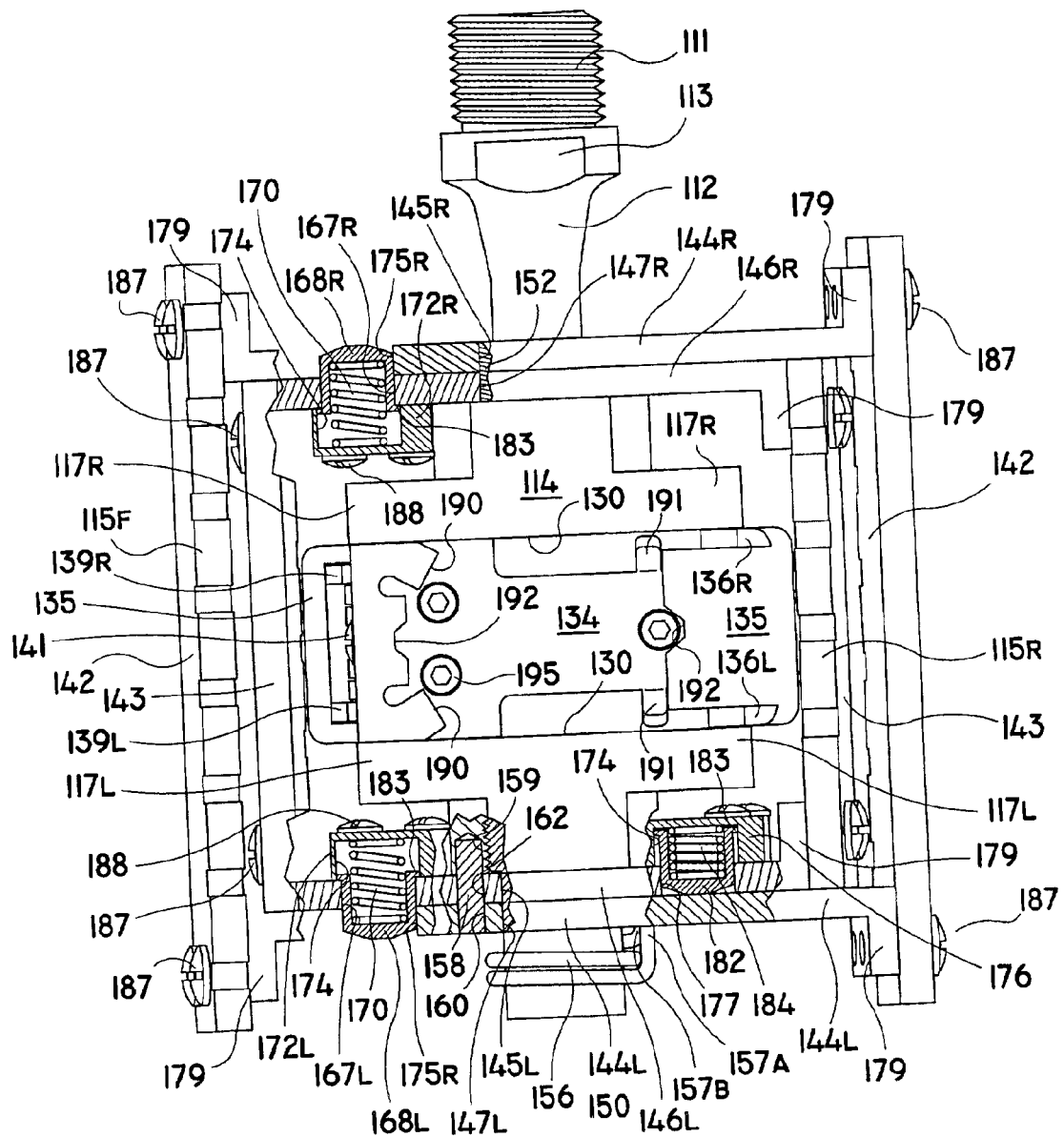

FIG. 13B is an top view, with partial sections showing internal details of an alternative embodiment of a bicycle pedal according to this invention with shoe-supporting surfaces in an extended position, for operation in unbound mode.

Figure 14:
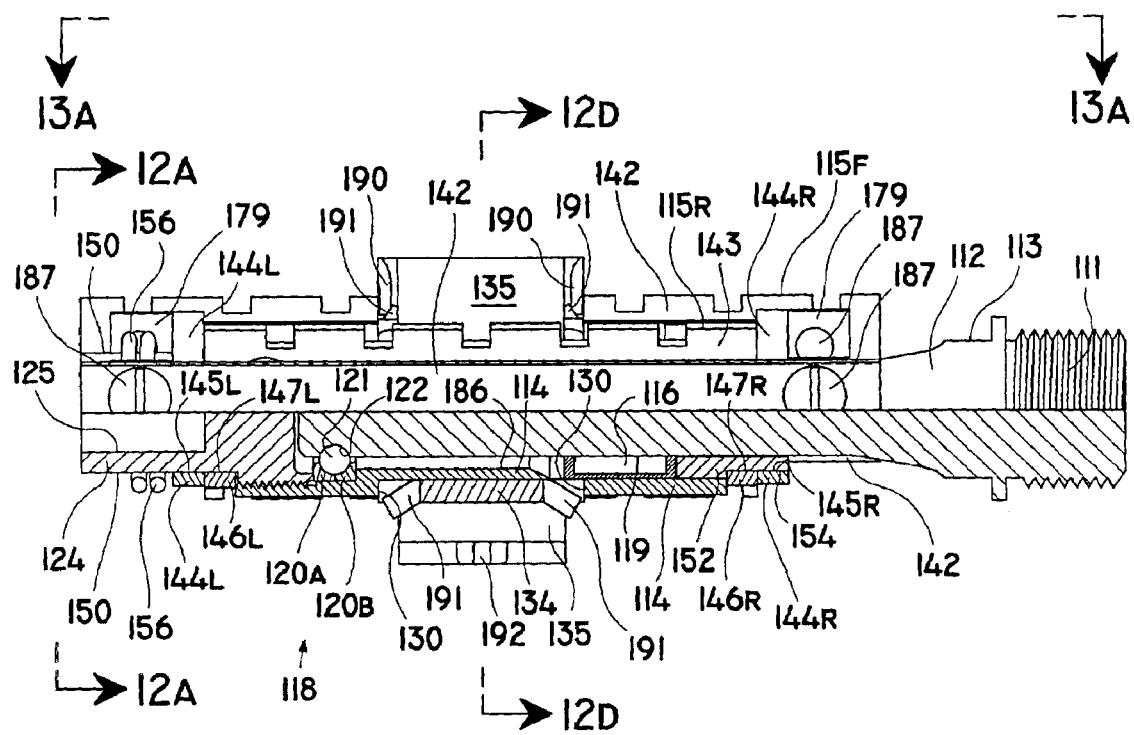

FIG. 14 is an end view, with a half section showing internal details of an alternative embodiment of a bicycle pedal according to this invention.

LIST OF REFERENCE NUMERALS PREFERRED EMBODIMENT

| 11 | threads | 12 | spindle | 13 | wrench flat |
|---|---|---|---|---|---|
| 14 | pedal body | 15 | shoe supporting surface | 16 | sealed roller bearing |
| 18 | ball bearing assembly | 19 | roller bearing journal | 20A, 20B | outer ball race |
| 21 | ball | 22 | groove | 23 | shaft seal |
| 24 | retainer cap | 25 | screwdriver slot | 27 | shoe |
| 28 | sole | 29 | recessed sole portion | 30 | cutout |
| 31 | cleat | 32 | binding | 33F, 33R | tab |
| 34 | base | 35 | bail | 36 | cutout |
| 37 | hole | 38F, 38R | pin | 39 | push tab |
| 40 | lock spring | 41 | lock tab | 42 | link |

-continued

| 43 | linkage | 44 | axle | 45 | retraction spring |
|---|---|---|---|---|---|
| 46 | clip | 47 | protrusion | 48 | pin |
| 48B | bore | 49 | protrusion | 50 | clip |
| 51 | bevel | 52 | clip spring | 53 | tab |
| 54 | spring lever | 55 | end | 56 | hinge loop |
| 57 | end | 58A, 58B | release plate | 59 | cleat engagement notch |
| 60 | hinge loop | 61A, 61B | bail spring | 62 | pin |
| 63 | block | 64A, 64B | hinge loops | 65 | screw |
| 67 | cleat engagement guide | 66 | pin | 68 | pushrod |
| 69 | cleat ejector ramp | 70 | conical end | 71 | bore |
| 72 | pocket | 73 | mounting hole | 74 | stop button |
| 76 | central tube | 78 | central bore | 80 | stop ledge |
| 81 | upper ledge | 82 | lower ledge | 83, 84', 84" | aperture |
| 86 | rib | 87 | pin boss | 88F | front cleat tip rivet |
| 88R | rear cleat tip | 89 | aperture | 91 | |
| 92 | flush rivet | 94 | end rib | 95L, 95R | clip pocket |
| 96 | assembly hole | 97 | conical depression | 98 | thumb or forefinger |
| 99 | opposing finger (to 98) | | | | |

LIST OF REFERENCE NUMERALS
ALTERNATE EMBODIMENT

| 110 | linkage | 111 | threads | 112 | spindle |
|---|---|---|---|---|---|
| 113 | wrench flat | 114 | pedal body | 115 | shoe supporting surface |
| 115F, 115R | front, rear shoe supporting surface section | | | 116 | sealed roller bearing |
| 117L, 117R | left, right side arm | | | 118 | ball bearing assembly |
| 119 | roller bearing journal | 120A, 120B | outer ball race | 121 | ball |
| 122 | groove | 124 | retainer cap | 125 | hex wrench socket |
| 130 | slot recess | 132 | binding | 134 | base |
| 135 | bail | 136L, 136R | left, right bail pivot tab | | |
| 137' | bail pivot pin bore | 137" | bail pivot pin bore | 138 | bail pivot pin |
| 139L, 139R | left, right bail spring | | | 140 | bail spring block |
| 141 | adjustment screw | 142 | front rail | 143 | rear rail |
| 144L, 144R | left, right front rail connector plate | | | | |
| 145L, 145R | left, right front rail cage pivot bore | | | | |
| 146L, 146R | left, right rear rail connector plate | | | | |
| 147L, 147R | left, right rear rail cage pivot bore | | | 148 | front rail cage assembly |
| 149 | rear rail cage assembly | 150 | pivot journal | 152 | pivot tube |
| 154 | pivot journal | 156 | rail extension spring | 157A, 157B | spring end |
| 158 | limit pin | 159 | limit pin bore | 160 | limit slot |
| 160' | semicircular end | 160" | semicircular end | 162 | limit slot |
| 162' | semicircular end | 162" | semicircular end | 164 | spring end slot |
| 165 | spring end bore | 166 | spring end bore | | |
| 167L, 167R | left, right extension lock pin bore | | | | |
| 168L, 168R | left, right extension lock pin | | | 169 | shoulder |
| 170 | spring | 172L, 172R | left, right extension lock pin housing | | |
| 174 | housing lock pin bore | 175L, 175R | left, right semicircular surface | | |
| 176 | retraction lock pin housing | | | 177 | retraction lock pin bore |
| 178 | retraction lock pin bore | 179 | rail mount tab | 181 | threaded hole |
| 182 | retraction lock pin | 183 | shoulder | 184 | spring |
| 185 | threaded hole | 186 | central bore | 187 | rail screw |
| 188 | housing screw | 190 | cleat engagement guide | 191 | cleat ejector ramp |
| 192 | cleat engagement notch | 195 | screw | | |

DESCRIPTION OF INVENTION

A preferred embodiment of the convertible pedal is shown in FIGS. 1 through 7. A pedal for the left side of the bicycle is shown in all FIG. 2 provides a general view of most parts and features. A pedal spindle 12, preferably formed of high strength steel or titanium alloy, features threads 11 for attachment to a bicycle crank arm (not shown), and wrench flats 13 for tightening to crank arm. Pedal body 14 is preferably formed of extruded or cast aluminum alloy, or other lightweight metal or high strength plastic. All subsequently described parts, unless otherwise noted, are preferably formed of high strength metal such as alloy steel or titanium. FIG. 3D shows the full extrusion cross section profile with hidden lines. Pedal body 14 features top and bottom shoe supporting surfaces 15, optionally textured as shown here, to provide good shoe sole 28 traction (FIG. 4B). Top and bottom shoe supporting surfaces 15 are formed integral with central tube 76, ribs 86, and end ribs 94; these features creating apertures 83, 84', 84", and 89. Ribs 86 feature pin bosses 87, and central tube 76 features central bore 78 (FIGS. 5A, 7), machined with threads and multiple steps (not labeled). Central cutout 30, and pocket 72 are formed, such as by machining, into each section of extrusion forming pedal body 14 to provide operating space and protection for bindings 32, and most of the subsequently described parts of this invention. Cutout 30 is a generally rectangular shaped opening as viewed from the top in FIGS. 5A–5D, 6A, and 6B. Clip pockets 95L and 95R are rectangularly shaped extensions of cutout 30. Pedal body 14 also features stop ledges 80, and upper and lower ledges 81 and 82, respectively.

Spindle 12 is rotatably connected to central bore 78 by sealed roller bearing 16, and ball bearing assembly 18 (FIGS. 5A, 7). Roller bearing 16 rides on journal 19. Ball bearing assembly 18 comprises two angular contact outer ball races 20A and 20B, and balls 21, which ride in groove 22 in pedal spindle 12. Retainer cap 24 threads into central bore 78 of pedal body 14 to tighten against and fixedly retain outer ball races 20A and 20B. Spindle seal 23, formed of elastomer, is fixedly mounted in pedal body 14 and rotatably seals against spindle 12. Sealed roller bearing 16 features integral shaft seals (not labeled) on both sides of the cylindrical rolling elements. Each binding 32 is an assembly and moves as a unit, and consists of base 34, bail 35, pins 38F and 38R, springs 61L and 61R, block 63, screw 65, and lock spring 40. Each base 34 features pairs of tabs 33F and 33R. Each pair of tabs 33F and 33R fixedly support pins 38F and 38R, respectively. Axle 38R rotatably supports bail 35. Each bail 35 is urged forwards against the rear of base 34 by bail springs 61L and 61R. Urging force of each pair of bail springs 61L and 61R is adjustable by screw 65, threaded into block 63, and bearing against conical depression 97 of base 34 (FIG. 3A). Each bail 35 features cutout 36. Both base 34 and bail 35 feature cleat engaging notches 59. Base 34 features cleat engagement guides 67, and cleat ejector ramps 69. Base 34 features hole 37 through which push tab 39 of lock spring 40 protrudes. Lock spring 40 is fixedly mounted to base 34 with rivets 92, whose heads are flush with the top surface of base 34. Lock tabs 41 are formed on the transverse ends of lock spring 40. Pins 38F and 38R are fixedly mounted in, and protrude laterally outward from tabs 33F and 33R respectively, of each base 34, each protruding end being rotatably supported by link 42. Both axles 44 are fixedly supported on each end in pin bosses 87 of pedal body 14. Retraction springs 45 are mounted on axles 44, with one end bearing against link 42, and the other end bearing against central tube 76. Bail springs 61R prevent excessive axial movement of retraction spring 45, as can be seen in FIGS. 3A and 3B, keeping retraction spring 45 ends engaged with link 42 and central tube 76. Two clips 46 are rotatably supported in pedal body 14 by pins 48, which are fixedly mounted in bores 48B of pedal body 14 (FIGS. 1A, 1B). Similarly, two clips 50 are rotatably supported on pins 48, also fixedly supported in bores 48B of pedal body 14. Clips 46 and 50 are axially restrained on pins 48 by ledges 81 and 82. Clips 46 and 50 each feature protrusions 47 and 49, bevel 51, and tab 53. Clip 46 features end 55 and clip 50 features end 57. Springs 52 are fixedly mounted to clips 46 and 50 by rivets 91. Spring levers 54 are fixedly mounted to clips 46 by rivets 91, and feature hinge loops 56 on their ends. Release plates 58A and 58B feature hinge loops 60 on their ends which are rotatably connected to hinge loops 56 with pins 62. Pins 62 are fixedly mounted in hinge loops 60, and rotatably mounted in hinge loops 56. Both release plates 58A and 58B feature coaxial hinge loops 64A and 64B which are rotatably connected together with pin 66. Pin 66 is fixedly mounted in hinge loops 64A and 64B of release plate 58A and rotatably mounted in hinge loops 64A and 64B of release plate 58B. Pushrod 68 is slidably supported in bore 71 (FIGS. 6A, 6B) of pedal body 14, and features a conical end 70. Stop buttons 74 are fixedly mounted in mounting holes 73 in pedal body 14.

Assembly of the preferred embodiment is accomplished by first assembling each clip 46, to its associated spring 52, spring lever 54, and release plate 58A or 58B together with pins 60 and rivets 91. Each of these subassemblies is then inserted into cutout 30, feeding release plates 58A or 58B through apertures 89 formed by shoe supporting surfaces 15, pin bosses 87, ribs 86 and end ribs 94. Clips 46 are then placed in clip pockets 95L and affixed to pedal body 14 by pressing pin 48 into its respective bore 48B. Clips 50 are assembled to their respective springs 52 with rivets 91 and assembled to pedal body 14 with pins 48 in a similar manner. Next, bindings 32 are assembled to links 42 on pins 38F and 38R and inserted into cutout 30 while holding clips 46 and 50 apart, as in FIG. 6B. Links 42 are then affixed by insertion of axles 44 through pin bosses 87. Springs 45 are placed on axles 44 during the insertion of axles 44. Roller bearing 16 and ball race 20A are then assembled to central bore 78. Spindle 12 is then assembled to pedal body 14 by inserting it through roller bearing 16, and inner ball race 20A, far enough past its normal assembled position in order to fully expose groove 22. Journal 19 is made sufficiently long enough to avoid interference of the adjacent conical section of spindle 12 with the shaft seal of roller bearing 16 during this operation. Balls 21 are then assembled to groove 22 with grease, then the spindle is withdrawn to seat the balls into race 20A. Race 20B is then assembled and secured with threaded retainer cap 24. Release plates 58A and 58B are then assembled together by inserting pin 66 through assembly hole 96 (FIG. 5A), and pressing it into hinge loops 64A and 64B.

In operation of the preferred embodiment, pedal body 14 provides textured shoe supporting surfaces 15 on both the upper and lower sides of the pedal for gripping and supporting, under full rider's weight, the sole 28 of either a non-cycling shoe, or a cycling shoe 27 with a cleat, 31 mounted on a recessed sole portion 29 (FIGS. 9, 10). Shoe supporting surfaces 15 may be textured, an example of which is shown, or otherwise configured to provide a shoe gripping surface without cleat attachment. Needle roller bearings 16 with integral seals are used to provide high radial load capability on a relatively large shaft diameter section, and pedal spindle 12, may be appropriately hardened at journal 19, for use as the inner bearing race. Ball bearing assembly 18 carries both radial and axial loads and serves to rotatably affix pedal body 14 to spindle 12. Groove 22 may also be appropriately hardened.

Central cutout 30 encompasses bindings 32 and links 42 when they are retracted into pedal body 14. The cleat engagement features of the bindings shown here are similar to existing bindings, and do not constitute the essence of this invention. They are described here for clarity, and to show compatibility with the invention. They are representative of a family of clipless bindings which can be used; these mechanisms typically engaging a small cleat attached to the shoe and typically, but not always, recessed into the shoe sole. Cleat 31 is mounted to a recessed sole portion 29, of sole 28, of shoe 27. Cleat 31 has a front tip 88F, and a rear tip 88R, both of which are beveled on their bottom surfaces, flat on their top surfaces, and which engage notches 59F and 59R, respectively (FIG. 3C). Engagement is typically performed by inserting tip 88F into notch 59F first, then stepping downward into binding 32 so that the beveled bottom surface of tip 88R moves bail 35 rearward against the action of bail springs 61L and 61R. Cleat engagement guides 67 help direct front cleat tip 88F into cleat engaging notch 59F, and the flat upper surface of front cleat tip 88F is restrained from upward movement by the bottom surface of notch 59F. Once the extreme end of cleat tip 88R passes notch 59R, bail 35 moves forward and retains cleat 31 in notch 59R by contact with the flat upper surface of rear cleat tip 88R. The bottom surface of cleat 31 is now resting on the top surface of base 34, as shown in FIG. 3C. To release cleat 31, the rider twists their foot sideways, rotating cleat 31 in binding 32 about a vertical axis. The action of tip 88R against beveled notch 59R causes bail 35 to move rearward, allowing cleat 31 to rotate to a position where it contacts cleat ejector ramp 69, forcing cleat 31 upward and free from binding 32. Other types of recessed cleats and bindings exist and could easily be substituted for the bindings shown, as they are of similar size and shape. Bindings 32 extend far enough above the top surface of shoe supporting surface 15 to allow cleat engagement, rotation and release without shoe sole 28 making contact with shoe supporting surface 15.

One or both bases 34 rotatably connect the ends of links 42, to form a parallelogram type linkage. This forces links 42 to undergo simultaneous rotation when pivoting on axles 44. This results in both bindings 32 either extending out of cutout 30 of pedal body 14, or retracting into it simultaneously, when links 42 pivot counter-clockwise or clockwise, respectively, on axles 44, as viewed in FIGS. 3A, and 3B respectively. The retracted position of each binding 32 is determined by stop ledge 80, which contacts the bottom edge of bail 35, as shown in FIG. 3B, preventing any further retraction of bindings 32 into cutout 30 of pedal body 14. When fully retracted, the top exposed surfaces of bindings 32 are sufficiently flush, or below the top surface of shoe supporting surface 15 to assure that full and secure contact of sole 28 is made with shoe supporting surface 15, without contact of recessed cleat 31, on any part of the pedal (FIG. 4B).

Extension of bindings 32 from the retracted position of FIGS. 1B, 3B, and 4B are performed by placing thumb or forefinger 98 into cutout 36 on bail 35, and an opposing finger or thumb 99 on the top forward edge of pedal body 14, as shown in FIG. 3B, then squeezing finger and thumb together while simultaneously pulling upwards to extend bindings 32 to their extended position, as shown in FIG. 3A. This is a motion that can be performed while astride the bicycle, if desired, without the rider needing to look down at the pedal, at these features are large and easy to recognize by feel, and the motion is simple. In the fully retracted position of FIG. 3B, angle, φ, formed between a line through both link 42 rotation pivot axes at axles 44 and a line through one link 42 rotation pivot axis at axle 44 and a pivot axis at either pin 38F or 38R on the same link 42 is no less than 10 degrees. This prevents the parallelogram linkage from collapsing into an unstable state where all pivot axes at axles 44, 38F, and 38R lie in a single plane, which could prevent the extension of both bindings 32 by the aforementioned action of squeezing thumb 98 and finger 99 against bail 35 and pedal body 14, respectively.

Force for retraction motion of bindings 32 is provided by retraction springs 45, located coaxially on axles 44. One end of spring 45 bears against link 42, and the other against central tube 76, thus urging link 42 to rotate towards the retracted binding position. Bindings 32 are held in the extended position of FIGS. 1A, 2 and 3A by protrusions 47 and 49 on both clips 46 and 50, which rotate inward towards bindings 32 under the action of clip springs 52, to capture and restrain links 42 against rotation, as shown in FIGS. 2 and 5A.

When extending bindings 32, from the retracted position, as shown in FIGS. 1B and 4B, the front edge of link 42 slides against bevel 51, serving to pivot clips 46 and 50 laterally outward away from bindings 32, as shown in FIG. 6B. Bevel 51 is best viewed in FIG. 7. In the outwardly pivoted position of clips 46 and 50, protrusions 47 extend inward toward bindings 32 slightly more than protrusions 49, providing a positive motion stop for links 42 upon full extension of bindings 32. Lock tab 41 is beveled on its underside to avoid interference with outwardly rotated ends 53 of clips 46 and 50, as bindings 32 approach their fully extended position. Once motion of links 42 are stopped in the binding extended position (FIG. 6B), clips 46 and 50 pivot about pins 48 inward toward the binding under the actions of clip springs 52 to firmly lock links 42 into the binding extended position shown in FIGS. 1A, 2, 3A, 4A and 6A. With the cleats 31 engaged, the rider may, in addition to the usual downward pushing force, also push forward and/or pull rearward at top and bottom parts of the pedal stroke, respectively, and this force is transmitted to the pedal body by clips 46 and 50 through pins 48 to transfer additional motive energy to the bicycle. Furthermore, these forward and rearward pedaling forces are transferred into pedal body 14 by all 4 clips (46 and 50) and pins 48, even though only one binding 32 is engaged. This reduces stress and deflection on these and other components.

To retract bindings 32 for unbound operation, the cyclist pushes inward with forefinger or middle finger 98 on release plates 58A and/or 58B, near or on the hinge joint of pin 62 and hinge loops 64A and 64B connecting them together (FIG. 6B). These plates are large and easy to find by feel, without the rider needing to look down to find them. The motion is, like the aforementioned binding extension operation, easily accomplished while astride the bicycle, without the need to look down at the pedal. In the usual case where the cyclist's shoe cleat 31 is not engaged with binding 32, the toggle-like spreading action of release plates 58A and 58B, as they are depressed, serve to push both hinge loops 56 on spring levers 54 apart from each other, causing clips 46 to pivot away from the binding, thereby releasing both links 42 which are held by clips 46. Simultaneously, each end 55 of clip 46 pushes against end 57 of clip 50 during this pivoting motion, causing clips 50 to pivot away from both links 42 which they are engaged with, as shown in FIG. 6B. Both bindings 32 are then free to retract into cutout 30 of pedal body 14, under the actions of retraction springs 45. The stiffness of spring lever 54 is made sufficiently higher than the stiffness of clip springs 52 to assure sufficient rotation of clips 46 and 50 under these conditions. Should any unbalanced forces be present between bindings 32 and their associated clips and spring levers, such as from presence of dirt, or a forward or rearward force component applied to release plates 58A and/or 58B, stop buttons 74 provide a centering force to maintain symmetric and equal pivoting action of all clips 46 and 50 at their maximum outwardly pivoted angle, as shown in FIG. 6B. This ensures that both bindings 32 are released for retraction simultaneously. Release of links 42, and thus retraction of bindings 32, will occur just before release plates 58A and 58B reach their fully spread position, however provision for these release plates to reach and extend past their fully spread position is provided for an alternate mode of operation described in the next paragraph below. If this overextension occurs, as shown in FIG. 6A where angle θ' is less than 180 degrees, under either mode of operation, pushrod 68, slidably located in bore 71 of pedal body 14 provides for return of release plates 58A and 58B to a less than fully spread position by moving laterally outward to contact release plate 58A, as indicated in FIG. 6B by angle θ exceeding 180 degrees. This occurs when the front edge of link 42 slides against conical end 70 of pushrod 68, pushing it outwards when almost fully pivoted to the position for full binding 32 retraction shown in FIGS. 4B, and 5C. Once release plates 58A and 58B reach a less than fully spread position, clip springs 52 move them back to their normal resting position through clips 46 and 50, and spring lever 54. The bulged center section of link 42 occludes a small part of conical end 70 throughout the range of motion of link 42, thus allowing only the majority of conical end 70 to extend into cutout 30. The cylindrical section of pushrod 68 is kept within bore 71 to avoid contact with the edge of links 42, which would prevent their rotation. Release plate 58A prevents pushrod 68 from falling out of bore 71.

Though the motion of bindings 32 relative to shoe supporting surfaces 15 is arcuate, it is the height of the top surfaces of each binding 32 relative to the height of the corresponding shoe supporting surface 15 which determines whether the pedal can be used in either a clipless binding mode, with a cycling shoe 27 having a sole 28 recessed cleat 31 attaching to a clipless binding 32, or in an unbound mode where a cycling shoe 27, or other shoe contacts primarily a shoe supporting surface and is otherwise unattached to the pedal. This relative height can best be defined as the difference of the height above the spindle axis of a cylinder having a radius similar to that of the forefoot portion of a typical rigid, curved sole cycling shoe, here taken to be 8 inches, whose axis is parallel to the rotation axis of spindle and surface is tangent to shoe supporting surface 15, at the point of shoe sole 28 contact, thus locating the cylinder a minimum distance from the spindle axis, and the height above the spindle axis of a second cylinder similarly parallel to spindle 12 rotation axis, whose axis lies in the plane defined by the spindle axis and the first cylinder axis, and whose surface is tangent to the uppermost facing surfaces of a binding 32.

Dimensions for these heights are shown in FIG. 8, which, although showing a variation of the preferred embodiment, also apply, in a like manner, to the preferred embodiment described above, the alternative embodiments described below, as well as any other pedal which is claimed to provide both clipless binding and unbound modes of operation. The height of shoe supporting surface 15 is denoted HS. The two possible heights of the corresponding binding are denoted HB and HB' for bindings in the retracted (for unbound operation) and extended (for clipless binding operation) positions, respectively.

FIGS. 3C and 6A show operation of a "pre-retract" mode of operation whereby the pedal can be set in advance to automatically retract bindings 32 into cutout 30 immediately upon release of cleat 31 from binding 32. When cleat 31 is engaged with binding 32, upper lockspring 40 is deflected downward, placing lock tabs 41 into the space between tabs 53 and cutout 30. This blocks the pivoting action of upper clips 46 and 50 thus preventing retraction of bindings 32. The cyclist still depresses release plates 58A and/or 58B in the manner previously described, and this action will cause spring levers 54 to bend into an arcuate shape, as shown in FIG. 6A. When release plates 58A and 58B are fully depressed, they extend through their maximally spread position until hinge loops 64A and 64B contact pedal body 14 at the base of pocket 72, shown as θ' in FIG. 6A. They are held in this overextended position, which is slightly but sufficiently stable, under the force of spring levers 54 until the cyclist disengages cleat 31 from binding 32. Cleat 31 disengagement allows lock spring 40 to unbend, moving lock spring ends 41 upward and out of the space between tabs 53 and cutout 30. This frees clips 46 and 50 to pivot fully outward away from bindings 32, under the action of spring levers 54, as shown in FIG. 6B. Bindings 32 are then free to retract into cutout 30 under the action of retraction springs 45, as described previously. Similarly as before, when bindings 32 approach their fully retracted position, outer front edge of link 42 slides against conical end 70 of pushrod 68, thus urging pushrod 70 outward, against release plate 58A. This outward movement of pushrod 68 is sufficient to articulate release plates 58A and 58B out of their overextended position whereby the force of spring levers 54 return release plates to their normal resting position.

In a variation of the the preferred embodiment, shown in FIG. 8, shoe supporting surfaces 15 of pedal body 14' are placed slightly higher (further apart from each other) and links 42' made slightly longer to allow a corresponding increase in the distance between pins 38F and 44 and between 38R and 44 thusly providing further retraction of bindings 32 into pedal body 14'. This may provide better shoe sole grip for worn down shoe soles, and possibly allow the use of certain non-sole recessed cleat and binding systems by allowing the cleat to protrude into cutout 30.

A further alternate embodiment of the convertible pedal is shown in FIGS. 11 through 14. A pedal for the left side of the bicycle is shown in all figures. FIG. 11A provides a general view of most parts and features. A pedal spindle 112, preferably formed of high strength steel or titanium alloy, features threads 111 for attachment to a bicycle crank arm (not shown), and wrench flats 113 for tightening to crank arm. Pedal body 114 is preferably formed of aluminum alloy, or other lightweight metal or high strength plastic. All subsequently described parts, unless otherwise noted, are preferably formed of high strength metal such as aluminum, steel, or titanium alloys. Body 114 features central bore 186 (FIG. 14), two left side arms 117L, two right side arms 117R, and four bail pivot pin bores 137". Central bore 186 is machined with threads and multiple steps (not labeled).

Spindle 112 is rotatably connected to central bore 186 by sealed roller bearing 116, and ball bearing assembly 118 (FIG. 14). Sealed roller bearing 116 is a needle type roller bearing that is fixedly mounted in central bore 186 and rotates on journal 119. Roller bearing 116 features integral shaft seals (not labeled) on both sides of the cylindrical rolling elements. Ball bearing assembly 118 comprises two angular contact outer ball races 120A and 120B, that are filled with balls 121, which ride in groove 122 of pedal spindle 112. Retainer cap 124 features hex wrench socket 125, and threads into central bore 186, to tighten against and fixedly retain outer ball races 120A and 120B. Retainer cap 124 features pivot journal 150 (FIGS. 11A, 11B, 12A, 12B, 14), which is concentric with central bore 186. Pivot tube 152 (FIG. 14) is fixedly mounted in central bore 186 and features pivot journal 154 which is also concentric with central bore 186. A small radial clearance is present between pivot tube 152 and spindle 112 such that no rubbing contact occurs.

Two bindings 132 (FIG. 12D) are present, one on the upward, shoe facing side of the pedal, and one on the downward, ground facing side of the pedal. Each binding 132 is an assembly comprising base 134, bail 135, bail pivot pin 138, left and right bail springs 139L (FIG. 13A) and 139R respectively, block 140, and adjustment screw 141. Base 134 is fixedly mounted to body 114 with screws 195. Slot recess 130 (FIG. 11A) locates base 134 onto body 114. Bail pivot pins 138 are fixedly mounted in bail pivot pin bores 137" of left and right side arms 117L and 117R and rotatably support bails 135 on bail pivot pin bores 137' of bail pivot tabs 136L and 136R. Left and right bail springs 139L and 139R are also rotatably supported on bail pivot pins 138. Each bail 135 is urged forwards against base 134 by bail springs 136L and 136R. Urging force of each pair of bail springs 136L and 136R is adjustable by adjustment screw 141, threaded into block 140, and bearing against body 114. Both base 134 and bail 135 feature cleat engaging notches 192. Base 134 features cleat engagement guides 190, and left and right cleat ejector ramps 191 (FIG. 11A).

Left front rail connector plate 144L features left pivot bore 145L (FIGS. 12A, 12B, 13B, 14), limit slot 160 (FIGS. 12A, 12B, 12C), spring end slot 164 (FIGS. 11A, 12A, 12B), spring end bore 166 (FIG. 12C), retraction lock pin bore 178 (FIG. 13A), left semicircular surface 175L, two rail mount tabs 179, each tab featuring two threaded holes 181. Left rear rail connector plate 146L features left pivot bore 147L (FIGS. 13B, 14), spring end bore 165 (FIG. 12C), limit slot 162 (FIGS. 12A, 12B, 12C), extension lock pin bore 167L (FIGS. 12B, 12C, 13A, 13B), retraction lock pin bore 177 (FIGS. 13A, 13B), four threaded holes 185 (FIGS. 11B, 12B), two rail mount tabs 179, each tab featuring two threaded holes 181 (FIG. 11A). Right front rail connector plate 144R features pivot bore 145R (FIGS. 13B, 14), right semicircular surface 175R (FIG. 13A), two rail mount tabs 179, each tab featuring two threaded holes 181. Right rear rail connector plate 146R features right pivot bore 147R, extension lock pin bore 167R, two threaded holes 185, and two rail mount tabs 179, each tab featuring two threaded holes 181 (FIG. 13A). Pivot journal 150 rotatably supports left front and rear rail connector plates 144L and 146L on their pivot bores 145L and 147L respectively. Similarly, pivot journal 154 rotatably supports right front and rear rail connector plates 144R and 146R on their pivot bores 145R, and 147R, respectively. Two front rails 142 are fixedly attached to rail mount tabs 179 of left and right front rail connector plates, 144L and 144R with screws 187, to form a front rail cage assembly 148 (FIGS. 11B, 12B) which pivots as a unit on journals 150 and 154. Similarly, two rear rails 143 are fixedly attached to rail mount tabs 179 of left and right rear rail connector plates, 146L and 146R with screws 187, to form a rear rail cage assembly 149 (FIGS. 11B, 12B) which also pivots as a unit on journals 150 and 154. Pedal body 114 features limit pin bore 159 (FIGS. 13A, 13B). Limit pin 158 is fixedly mounted in limit pin bore 159 and protrudes through both limit slot 160 of left front rail connector plate 144L and limit slot 162 of left rear rail connector plate 146L. Front and rear shoe supporting surface sections 115F, 115R, optionally textured as shown here, are formed in the upward, shoe facing edges of both front rails 142, and rear rails 143, respectively, to provide good shoe sole 28 traction (FIG. 12B) when operating in unbound mode. Each pair of front and rear shoe supporting surface sections 115F and 115R, respectively, on each side of the pedal form a shoe supporting surface 115 (FIG. 12B), as an assembly, since neither section can support a shoe by itself, due to the freely rotatable body 114. Rail extension spring 156 is rotatably mounted on pivot journal 150, and features ends 157A and 157B (FIG. 11A). End 157A is fixedly mounted in spring end bore 165, and end 157B protrudes through spring end slot 164, and is fixedly mounted in spring end bore 166. Rail extension spring 156 urges front rail cage assembly 148 to pivot on journals 150 and 154 clockwise relative to rear rail cage assembly 149, as viewed in FIGS. 12A, 12B, 13A, and 13B.

Left extension lock pin housing 172L (FIGS. 11A, 13A, 13B) is fixedly mounted to left rear rail connector plate 146L with housing screws 188 in threaded holes 185. Similarly right extension lock pin housing 172R is fixedly mounted to right rear rail connector plate 146R with housing screws 188 in threaded holes 185. Housings 172L and 172R feature housing lock pin bores 174, which are located coaxially with left and right extension lock pin bores 167L and 167R, respectively. Left and right extension lock pins 168L and 168R are slidably mounted in housing lock pin bores 174, and are urged transversely outwards from the vertical midplane of the pedal by the action of springs 170. Extension lock pins 168L and 168R feature shoulders 169 which limit their outward motion by contact with left and right rear rail connector plates 146L and 146R, respectively. Similarly, retraction lock pin housing 176 is fixedly mounted to left rear rail connector plate 146L with housing screws 188, in threaded holes 185, and features a housing lock pin bore 174 located coaxially with retration lock pin bore 177. Retraction lock pin 182 is slidably mounted in housing lock pin bore 174 and is urged outward by spring 184 to pass through retraction lock pin bore 177. Shoulder 183 limits outward motion of retraction lock pin 182 by contact with left rear rail connector plate 146L.

In operation, for clipless binding mode, as depicted in FIGS. 11A, 12A, 12D, 13A, and 14, binding 132 engages and disengages cleat 31 in the same manner as binding 32 in the preferred embodiment, and the description will not be repeated here. In clipless binding operation, front rail cage assembly 148 and rear rail cage assembly 149 are rotated about an axis through the center of pivot journals 150 and 154 to retract shoe supporting surface sections 115F and 115R sufficiently toward the horizontal midplane of the pedal to allow cleat 31 to engage either of the two bindings 132 without contact of sole 28 against the corresponding shoe supporting surface sections 115F and 115R (FIG. 12A) on the same side of the pedal. Front rail cage assembly 148 and rear rail cage assembly 149 are held in this retracted position against the force of rail extension spring 156 by retraction lock pin 182 which extends though lock pin bores 177 and 178, thus preventing front rail and rear rail cages from pivoting about the journal axis with respect to each other. Front and rear rail cages 148 and 149, respectively, are simultaneously aligned rotationally with respect to body 114 by contact of limit pin 158 against semicircular end 160' of front rail limit slot 160 and semicircular end 162' of rear rail limit slot 162, respectively. No shoe forces are applied to front rails 142 or rear rails 143, thus only one retraction lock pin 182 is necessary. Cleat 31 can be engaged and disengaged freely from either binding 132 for clipless binding operation without contact of sole 28 on front or rear shoe supporting surfaces 115F and 115R, respectively, or any other part of front or rear rail cage assemblies 148 and 149, respectively. Left and right extension lock pins 168L and 168R are held fully retracted inside extension lock pin housings 172L and 172R, by left and right front rail connector plates 144L and 144R, respectively (FIG. 13B).

To set the pedal for unbound operation, as is depicted in FIGS. 11B, 12B, 12C, and 13B, whereby sole 28 applies fall pressure to either shoe supporting surface 115, without contact of recessed cleat 31 on any part of either binding 132 or any other part of the pedal, retraction lock pin 182 is depressed with thumb or finger (not shown) until it exits retraction lock pin bore 178. Rail extension spring 156 then urges front rail cage assembly 148 to pivot on journals 150 and 154 clockwise with respect to rear rail cage assembly 149, as viewed in FIG. 12B. This scissors-like action moves both front shoe supporting surface sections 115F, and rear shoe supporting surface sections 115R away from the horizontal midplane of the pedal, extending above bindings 132 on each side of the pedal, and effectively increasing the height of shoe supporting surfaces 115 relative to the height of bindings 132. Once the full outward extension of front rail cage assembly 148 and rear rail cage assembly 149 are reached, they are held in this extended position by left and right extension lock pins 168L and 168R, respectively, which extend outward from the vertical midplane of the pedal, through extension lock pin bores 167L and 167R, respectively, and through the cylindrical surfaces defined by left and right semicircular surfaces 175L and 175R, respectively, thus preventing front rail cage assembly 148 from pivoting counterclockwise with respect to rear rail cage assembly 149 on pivot journals 150 and 154. Front and rear rail cage assemblies 148 and 149, respectively, are simultaneously aligned rotationally with respect to body 114 by contact of limit pin 158 against semicircular end 160" of front rail limit slot 160, and semicircular end 162" of rear rail limit slot 162. In this position shoe forces applied to front and rear shoe supporting surface sections 115F and 115R, respectively, tend to urge, with high force, front rail cage assembly 148 to pivot counterclockwise relative to rear rail cage rail assembly 149, towards the retracted rail position. High shearing forces are generated on extension lock pins 168L and 168R, between extension lock pin bores 167L and 167R, and semicircular surfaces 175L and 175R respectively, and thus two lock pins are used, one on each side of the pedal. This also eliminates twisting forces in front and rear rail cage assemblies 148 and 149 that would be generated if only one extension lock pin 168L or 168R was used. In this configuration, retraction lock pin 182 is held fully retracted inside retraction lock pin housing 176 by left front rail connector plate 144L (FIG. 13B).

To set the pedal for clipless binding operation, from the unbound, rail cage extended position, front rail cage assembly 148 and rear rail cage assembly 149 are retracted toward the horizontal midplane of the pedal by placing a thumb or finger 98 on front shoe supporting surface section 115F and an opposing finger or thumb 99 the adjacent rear shoe supporting surface section 115R, and squeezing them together, while simultaneously, with the other hand, depressing both extension lock pins 168L and 168R towards each other, into their respective housings 172L and 172R, with the tip of a thumb or finger 98 (FIG. 12B) and the tip of an opposing finger or thumb 99 (not shown), respectively. Once left and right extension lock pins 168L and 168R are fully depressed into left and right extension lock pin bores 167L and 167R, respectively, front rail cage assembly 148 can be pivoted counterclockwise with respect to rear rail cage assembly 149 until the fully retracted rail position is reached and locked, as described earlier.

Thusly, body 114, bearings 116 and 118, pivot journals 150 and 154, extension lock pins 168L, 168R, retraction lock pin 182, front rail cage assembly 148, and rear rail cage assembly 149 comprise the primary parts of a rider actuated linkage 110 (FIG. 11A) rotatably connecting both bindings 132 and shoe supporting surfaces 115 to spindle 112 in a variable relative height configuration, sufficiently variable to allow the pedal to be used either as a clipless pedal on both sides of the pedal or as a unbound type pedal on both sides of the pedal, where the shoe is not attached to the pedal, and furthermore, recessed cleat 31 does not contact any part of the pedal.

CONCLUSIONS, RAMIFICATIONS, AND SCOPE

In conclusion, the invention provides a bicycle pedal that can be operated in either clipless binding mode on both sides of the pedal simultaneously or in unbound mode on both sides of the pedal simultaneously. It eliminates the need to carry separate shoe supporting surfaces that can be attached to a clipless binding pedal. The invention is an improvement over existing dual mode pedals, that have one side operating in unbound mode and the other side operating in clipless binding mode, by eliminating the necessity to spin the pedal one half turn, after determining which side is upwardly facing the shoe sole, in order to choose between clipless binding mode and unbound mode operation. This results in safer and more enjoyable riding, and provides a time advantage in some types of racing.

The description above is detailed and specific, showing only several embodiments out of many possible ones which provide the same novel functionality. As such, the invention is not limited to the description in scope. For example, new materials or fabrication methods may be substituted for the suggested ones in the description, and parts may be changed in size and shape to reduce weight, and costs, to increase strength and durability, or to improve performance, especially in adverse conditions such as the presence of mud or dirt. There are other possible mechanism configurations which provide similar functionality. As an example, it is possible to modify the alternate embodiment by affixing bases 134 to rear rail connector plates 146L and 146R, and affixing bail pivot pins 138 to front rail side plates 144L and 144R, in order to provide height variability in both the binding and the shoe supporting surfaces. This slightly reduces the total height of the pedal when operating in unbound mode. It would also be possible, and obvious to combine the main features of both the preferred embodiment with those of the last alternative embodiment, including the automatic conversion to unbound mode upon cleat release from the binding. There are other existing bindings possible which can be substituted, some of which are simple enough to be formed contiguous with a connecting linkage. Other possible bindings exist which can be substituted that have no moving parts. Other bindings which engage a non-sole recessed cleat may also be used to advantage, as the cleat could protrude slightly into cutout 30. The shoe supporting surfaces 15 of the preferred embodiment may be shaped differently than shown, such as flat, rather than curved. They may have less surface area shown, to provide extra clearance for muddy conditions. The shoe supporting surfaces of the preferred embodiment may consist of traditional cages, similar to the last alternative embodiment, rather than broad surfaces, though this might limit its compatibility to certain types of shoe sole designs. The need to seal, or otherwise protect the moving mechanisms against dirt and water is obvious and the addition of features not described here can be anticipated, such as shaft seals for exposed rotating parts, flexible boots for exposed sliding parts, gaskets, surface hardening treatments, the addition of rolling elements to replace sliding surfaces or elements, dry-film surface lubrication treatments, surface corrosion protection treatments, surface texturing treatments, or features to provide better shoe grip, etc. The second alternative embodiment described here, having only one binding, but retaining some of the parts necessary for operation with two bindings can obviously be simplified for cost savings, at the expense of being easily convertible to the preferred embodiment, by the simple addition of another binding. Similarly, the last alternative embodiment can be reconfigured to provide for lighter weight, lower cost, and to provide other improvements.

Thus, the scope of the invention should be determined by the appended claims and their legal equivalents, rather than by the examples given.

I claim:

1. A pedal having:
   (a) a spindle for attachment to a crankarm, said spindle having an axis of rotation,
   (b) a first unbound shoe supporting means for supporting at least a majority of a rider's weight through a rider's shoe on its sole without attachment of said shoe to said first unbound shoe supporting means, rotatably attached to said spindle, said first unbound shoe supporting means having, in a first generally horizontal shoe receiving orientation, a first surface means, located above said spindle, consisting of all generally shoe facing surface portions of said first unbound shoe supporting means, including any edges of said surface portions, said first surface means having, in said first shoe receiving orientation, at least one surface portion on each side of a vertical plane through said spindle axis, said first surface means being configured to at least partially surround a corresponding (c) first binding, in said first shoe receiving orientation, said first binding being from the group of shoe bindings comprising a mechanism which attaches to a cleat mounted to and recessed within the sole of said shoe, (d) a second surface means on either said first unbound shoe supporting means, or optionally on a second unbound shoe supporting means for supporting at least a majority of said rider's weight through said rider's shoe on its sole, without attachment of said shoe to either said first or said optional second unbound shoe supporting means, rotatably attached to said spindle, said second surface means located opposite said first surface means in a second shoe receiving orientation, said second surface means consisting, in said second shoe receiving orientation, of all generally shoe facing surfaces of said first or said optional second unbound shoe supporting means, including any edges of said surface portions, said second surface means having, in said second shoe receiving orientation, at least one shoe facing surface portion located on each side of a vertical plane through said spindle axis, said second surface means optionally being configured to at least partially surround an optional corresponding (e) second binding in said second shoe receiving orientation, said second binding also being from the group of shoe bindings comprising a mechanism which attaches to a cleat mounted to and recessed within said shoe sole, (f) means for rotatably connecting all said bindings to said spindle, (g) a relative position variability means providing for varying a securely holding the relative position of each said binding and each said corresponding surface means with respect to each other, under normal pedaling shoe sole force, whereby each said binding has no intersection with a plane parallel to said spindle axis and touching said corresponding surface means on both sides of said vertical plane without intersection of said plane with said first or said option second unbound shoe supporting means, and providing for positioning and securely holding the relative position of each said binding and each said corresponding shoe supporting surface with respect to each other, whereby each said binding intersects a plane parallel to said spindle axis and touching said corresponding surface means on both sides of said vertical plane without intersection of said plane with said first or said optional second unbound shoe supporting means, sufficiently to allow said cleat to attach to said bindings.

2. The pedal of claim 1, having a means for stimulaneously changing said relative positions of all said bindings and all said corresponding surface means with respect to each other, whereby each said binding does not intersect a plane parallel to said spindle axis and touching said corresponding surface means on both sides of said vertical plane without intersection of said plane with said first or said optional second unbound shoe supporting means, in the absence of said binding, upon a single actuation of said relative position variability means by said rider, and having a means for simultaneously changing said relative position of all said bindings and all said corresponding surface means with respect to each other, whereby each said binding intersects a plane parallel to said spindle axis and touching said corresponding surface means on both sides of said vertical plane without intersection of said plane with said first or said optional second unbound shoe supporting means, in the absence of said bindings, sufficiently to allow said cleat to engage said bindings, upon a single actuation of said relative position variability means by said rider.

3. The pedal of claim 1, wherein the position of all said surface means relative to said spindle axis are fixed.

4. The pedal of claim 1, having additionally, a means for presetting, in a cleat engaged pedal state, said relative position variability means to simultaneously change said relative position of a said bindings and all said corresponding surface means with respect to each other, whereby each said binding has no intersection with a plane parallel to said spindle axis and, touching said corresponding surface means on both sides of said vertical plane without intersection of said plane with either said first or said optional second unbound shoe supporting means, in the absence of said binding, immediately upon detachment of said cleat from said binding, without other actuation by said rider at the time of said cleat detachment.

5. The pedal of claim 1 wherein at least part of said bindings are continuous with at least part of said relative position variability means.

6. A pedal having:

(a) a spindle for attachment to a crankarm, said spindle having an axis of rotation, (b) a first unbound shoe supporting means for supporting at least a majority of a rider's weight through a rider's shoe on its sole without attachment of said shoe to said first unbound shoe supporting means, rotatably attached to said spindle, said first unbound shoe supporting means having, in a first generally horizontal shoe receiving orientation, a first surface means located above said spindle, consisting of all generally shoe facing surface portions of said first unbound shoe supporting means, including any edges of said surface portions, said first surface means having at least one surface portion located on each side of a vertical plane through said spindle axis, said first surface means being configured to at least partially surrounded a corresponding:

(c) first binding, in said first shoe receiving orientation, said first binding being from the group of shoe binding comprising a mechanism which attaches to a cleat mounted to and recessed within the sole of said shoe, said cleat having a depth of engagement with said binding, (d) a second surface means on either said first unbound shoe supporting means, or optionally on a second unbound shoe supporting means for supporting at least a majority of said rider's weight through said rider's shoe on its sole, without attachment of said shoe to either said first or said optional second unbound shoe supporting means, rotatably attached to said spindle, said second surface means located opposite said first surface means in a second generally horizontal shoe receiving orientation, said second surface means consisting of all generally shoe facing portions of said first optional second shoe supporting means, including any edges of said surface portions, said second surface means having at least one shoe facing surface portion located on each side of a vertical plane through said spindle axis, said second surface means optionally being configured to at least partially surround an optional corresponding (e) second binding, in said second shoe receiving orientation, said second binding also being from the group of shoe bindings comprising a mechanism which attaches to a cleat mounted to and recessed within said shoe sole, said cleat having a depth of engagement with said binding, (f) each said surface means having a height defined as the distance from said spindle axis to a first imaginary gauge cylinder touching said surface means on both sides of said vertical plane without intersection of said first cylinder with said first or said optional second unbound shoe supporting means, said first cylinder having a longitudinal axis aligned parallel to said spindle axis, said first cylinder having a radius of 8 inches, (g) each said binding having a height defined as the distance from said spindle axis to a second imaginary gauge cylinder touching the uppermost surface of said binding, said second cylinder having no intersection with said binding, each said second cylinder having a radius of 8 inches, each said second cylinder having a longitudinal axis aligned parallel to the corresponding said first cylinder axis on the same side of the pedal, each said second cylinder axis being constrained to lie in the plane defined by said spindle axis and said corresponding first cylinder axis, (h) means for rotatably connecting all said bindings to said spindle, and (i) a relative height variability means for varying and securely holding the difference of said heights of said bindings and said heights of said corresponding surface means providing for positioning and securely holding, under significant pedaling shoe force, said heights of said bindings generally the same as or less than said heights of said corresponding surface means, and providing for positioning and securely holding, under significant pedaling shoe force, said heights of said bindings greater than said heights of said corresponding surface means by at least said depth of engagement.

7. The pedal of claim 6, having a means for simultaneously varying and securely holding the difference of said heights of all said bindings and all said corresponding surface means whereby all said binding heights are generally the same as or less than said heights of all said surface means, upon a single actuation of said relative height variability means by said rider, and having a means for simultaneously changing the difference of said heights of all said bindings and all said corresponding surface means whereby all said binding heights are greater than said heights of all said surface means by at least said depth of engagement, upon a single actuation of said relative height variability means by said rider.

8. The pedal of claim 6, wherein said height of said surface means are fixed.

9. The pedal of claim 6, having additionally, a means for presetting said relative height variability means to simultaneously change said relative height between all said bindings and all said corresponding surface means whereby all said binding heights are generally the same as or less than said heights of said corresponding surface means, immediately upon detachment of said cleat from the said binding to which said cleat was engaged, without other actuation by said rider at the time of said cleat detachment.

10. The pedal of claim 6 wherein at least part of said binding are continuous with at least part of said relative height variability means.

11. A pedal for use with a rider's shoe having an attached cleat recessed within the sole of said shoe, comprising:

a) a spindle, for attachment to a crankarm, said spindle having an axis of rotation, b) a body, rotatably attached to said spindle, said body having a first shoe supporting surface, and a second shoe supporting surface disposed oppositely from said first shoe supporting surface, each said shoe supporting surface being generally parallel to said spindle axis and having a height above said spindle axis at the general location of shoe sole contact in a normal pedaling foot position whereby the ball of the rider's foot is placed substantially over said spindle axis, and whereby the pressure of the rider's foot is evenly distributed transversely across said shoe supporting surface, c) a first binding, arranged generally in the shoe sole receiving position of said first shoe supporting surface, and a second binding disposed oppositely from said first binding, each said binding being from the group of clipless shoe binding mechanisms designed to attach to a cleat mounted to, and recessed within the sole of said shoe, each said binding having an uppermost shoe-facing surface or plurality of surfaces, each said binding having a general height of said uppermost shoe-facing surface or plurality of surfaces from said spindle axis, d) a support linkage for attaching said bindings to said body in a height variable configuration comprising:

e) a cavity for containing said bindings and said support linkage, generally centrally disposed in said body, said cavity perforating both said shoe supporting surfaces, said cavity having a vertical longitudinal plane in the direction of travel, passing through the center of said cavity, said cavity having an outward transverse side, located on the side of said longitudinal plane opposite said crankarm, and an inward transverse side, located on the side of said longitudinal plane closest to said crankarm, said cavity having at least a first pocket formed in said outward side, adjacent to said first binding, f) a first pivot pin, having a pivot axis parallel to said spindle axis and located generally forward, in the direction of travel, of said spindle axis, fixedly mounted, on its ends, in said outward and inward sides of said cavity, thusly spanning the transverse width of said cavity, g) a second pivot pin, having a pivot axis parallel to said spindle axis, located generally rearward, in the direction of travel, of said spindle axis, and fixedly mounted, on its ends, in said inward and outward sides of said cavity, thusly spanning the transverse width of said cavity, h) a first outward link, rotatably supported at its midpoint on said first pivot pin, and arranged contiguous to said outward side of said cavity, i) a first inward link, rotatably supported at its midpoint on said first pivot pin, and arranged contiguous to said inward side of said cavity, j) a second outward link, rotatably supported at its midpoint on said second pivot pin, and arranged contiguous to said outward side of said cavity, k) a second inward link, rotatably supported at its midpoint on said second pivot pin, and arranged contiguous to said inward side of said cavity, l) said first outward link and said first inward link rotatably supporting, at a first distal end of each said link, m) a first mounting pin, said first pin having an axis of rotation generally parallel to said spindle axis, n) said first outward link and said first inward link rotatably supporting, at a second distal end of each link, o) a second mounting pin, said second mounting pin having an axis of rotation generally parallel to said spindle axis, p) said second outward link and said second inward link rotatably supporting, at a first distal end of each said link on the same side of a central horizontal plane through said spindle axis as said first distal ends of said first inward and outward links, q) a third mounting pin, said third mounting pin having an axis of rotation generally parallel to said spindle axis, r) said second outward link and said second inward link rotatably supporting, at a second distal end of each link, s) a fourth mounting pin, said fourth mounting pin having an axis of rotation generally parallel to said spindle axis, t) a first binding base, said first base providing for mounting of said cleat engaging mechanism of said first binding, said first base fixedly attached to said first and third mounting pins between all said inward and said outward links, said first binding base substantially spanning the transverse distance between all said inward and outward links, u) a second binding base, said second binding base providing for mounting of said cleat engaging mechanism, said second binding base fixedly attached to said second and fourth mounting pins between all said inward and said outward links, the transverse width of said base substantially spanning the distance between all said inward and outward links, said support linkage thusly connecting said bindings to said body on an articulable parallelogram support linkage, with said support linkage restrained from sliding lateral motion on said pivot pins by said inward and outward cavity sides, thusly allowing said bindings to have a substantially variable height relative to said corresponding shoe supporting surfaces, said support linkage thusly having a binding extended position, where said bindings are extended maximally outward from said cavity, and a binding retracted position wherein said bindings are retracted into said cavity, v) at least one latch for releasably securing said support linkage against articulation in said binding extended position, each said latch comprising a member articulably mounted in a said pocket of said cavity, each said member formed and arranged to engage and affix, with respect to said body, at least one articulating component of said linkage, when said support linkage is in said binding extended position, w) at least one biasing means for urging each said latch to engage and affix said articulable component or plurality of components, thusly providing for securing both said first and second bindings in said binding extended position whereby said cleat may be engaged with either of said bindings and motive pedaling force applied, to provide clipless binding operation, x) at least one latch releasing means for articulating all said latches away from all said latch engaged articulable components of said support linkage upon actuation by said rider, thusly providing for disengaging all said latches from said support linkage and allowing said support linkage to move said bindings away from said binding extended position, y) said cavity being of sufficient volume and extent to allow said support linkage, with said bindings attached, to articulate away from said binding extended position sufficiently to retract said bindings into said cavity sufficiently to allow said shoe supporting surface to firmly, safely, and comfortably support said shoe in a normal foot position without engagement of said cleat with either of said bindings, z) at least one biasing means acting upon at least one of said articulable components of said support linkage to provide for articulating said support linkage away from said binding extended position, thereby providing for retracting said bindings sufficiently into said cavity upon release of all said latches from said latch engaged articulable components, to allow said shoe supporting surfaces to firmly, safely, and comfortably support a shoe on its outsole, in a normal pedaling foot position without said cleat attaching to either of said bindings to provide unbound pedaling operation, aa) at least one stop for contacting at least one surface of said support linkage or said binding to prevent further parallelogram articulation-of said support linkage beyond said binding retracted position, ab) all said latches being additionally formed and arranged to allow articulation of said support linkage from said binding retracted position to said binding extended position without undue mechanical or frictional resistance of said latch on any part of said support linkage or bindings, and to provide re-engagement of all said latches to said latch engageable components upon a rider actuated articulation of said support linkage from said binding retracted to said binding extended position.

12. The pedal of claim 11 having additionally, a locking mechanism for preventing articulation of said support linkage away from said binding extended position upon actuation by said rider, when either said binding is engaged with said cleat, comprising:

a) said first pocket being additionally formed adjacent to said first outward link and said first binding, b) a second pocket formed in said outward side of said cavity, adjacent to said second outward link and said second binding, c) said first latch formed and arranged to engage and affix to said first link when said support linkage is in said binding extended position, d) a second said latch, said latch articulably mounted in a said second pocket, and formed and arranged to engage and affix to said second link when said support linkage is in said binding extended position, e) each said binding base having an aperture located generally central in said binding base, f) each said binding base having a lock spring for locking at least one said latch against release of support linkage when said cleat is engaged with said binding, comprising a cantilever leaf spring type member having a fixed end mounted to the underside of said base of each said binding, each said lock spring having a free end, each said free end substantially spanning said transverse width of said cavity and having at least one transverse edge, at least one said transverse edge having a stop, each said stop located in a transverse position over the gap between a said latch, in its link engaged position, and said latch's corresponding said pocket, said free end of each said lock spring having a central distal tab protruding through said aperture in said binding base and extending upward into the space occupied by said cleat when engaged with said binding, whereby said cleat, when engaged with said binding, will depress said central distal tab, deflecting said free end of said leaf spring downward, thereby inserting all said stops on said lock spring between all said corresponding latches and said corresponding pockets, preventing said articulation action of said latches away from said latch engaged links, preventing said release of said latches from said links, and thusly preventing said articulation of said support linkage away from said binding extended position, g) a presetable latch release mechanism, for providing the release of all said latches from said links immediately upon disengagement of said cleat from either said binding, without any otherwise actuation by a rider, comprising:

h) a first latch actuating arm, affixed to said first latch, and a second latch actuating arm affixed to said second latch, said first and second latch actuating arms each having a clevis on their free ends, said first and second latch actuating arms being formed of a suitable material in a suitable thickness to be elastically deformable in the manner of a leaf spring, i) a first toggle plate having a first clevis for forming a hinged connection with said clevis of said first latch actuating arm, and being rotatably connected with said first latch actuating arm at said clevises with a first clevis pin fixedly mounted in one of said connected clevises, and a second toggle plate having a first clevis for forming a hinged connection with said second latch actuating arm and being rotatably connected with said second latch actuating arm at said clevises with a second clevis pin fixedly mounted in one of said connected clevises, j) said first toggle plate having a second clevis, parallel to said first clevis, formed on an opposing edge from said first clevis, and said second toggle plate having a second clevis parallel to said first clevis of said second toggle plate formed on an opposing edge from said first clevis of said second toggle plate for forming a hinged connection with said second clevis of said first toggle plate, k) said first and second toggle plates being rotatably connected at said second clevises with a third pin, fixedly mounted in one of said second clevises, thusly forming a butterfly toggle mechanism which acts to spread apart said first and second latch actuating arms, simultaneously releasing said first and said second latches from said latch engaged components of said support linkage, upon application by said rider of a force on said butterfly toggle mechanism, directed generally at and along said spindle axis, l) a first toggle stop, formed or mounted in said body for limiting longitudinal motion of said first clevis of said first toggle plate, and a second toggle stop formed or mounted in said body for limiting longitudinal motion of said first clevis of said second toggle plate, m) said first toggle plate having a plane defined by the axes of rotation of said first and said second clevises of said first toggle plate, n) said second toggle plate having a plane defined by the axes of rotation of said first and said second clevises of said second toggle plate, said planes intersecting at an angle of less than 180 degrees, as measured between the sides of said toggle plates facing said longitudinal plane, when said butterfly toggle mechanism is in an unactuated state, o) said first and second toggle stops having a distance between them generally slightly less than the distance between said first clevises of said first and said second toggle plates when said planes of said toggle plates have an angle of 180 degrees between them, thusly centering said butterfly toggle latch releasing mechanism about said spindle axis upon actuation, thusly providing for the generally simultaneous release of said first and second latches from said first and second latch engaged components, respectively, in the event a non-axial force is inadvertently applied by said rider along with said axial force when depressing said hinge connected said toggle plates p) a third stop for limiting the articulation of said toggle plates to a position where the angle between said planes of said toggle plates is generally slightly greater than 180 degrees, located in a contacting position with said hinge connecting said first and second toggle plates, whereby said rider may depress said butterfly toggle mechanism fully to said third stop, while said cleat is engaged with a said binding, elastically deforming at least one said latch actuating arm, thusly providing for retention of said butterfly toggle type mechanism in a metastable latch releasing position, with at least one said latch being prevented from releasing by the action of said binding engaged cleat upon said lock plate, thusly providing for the release of all said locked latches only and immediately upon release of said cleat from said binding, q) a mechanism for returning said first and second toggle plates to a position whereby said angle between said planes of said toggle plates is less than 180 degrees, comprising a pushpin slidably mounted in a bore of said body, said pushpin having a conical end for slidably contacting an edge of said link, and an opposing end for contacting and exerting an outward force on one of said toggle plates, whereby the pivoting motion of said link acts upon said conical end to slide said pushpin in said bore towards said toggle plate, thusly returning said butterfly toggle mechanism from said metastable position to a stable position whereby the angle between said planes of said toggle plates is less than 180 degrees.

13. The pedal of claim 11, having additional said latches acting in unison, comprising:

a) said cavity having two said pockets formed in said outward side of said cavity, and two said pockets formed in said inward side of said cavity, b) a said latch articulably mounted in each said outward pocket, hereby referred to as outward latches, c) a said latch articulably mounted in each said inward pocket, hereby referred to as inward latches, thusly providing multiple and evenly distributed affixation means for securing said support linkage in a binding extended position, d) all said outward latches having additionally an actuating arm extending partially across said cavity towards said inward latches, e) all said inward latches having additionally an actuatable arm extending partially across said cavity towards said outward latches and formed to be actuatable by said actuating arm of said outward latch, thusly providing for the simultaneous release of all said latches from said latch engaged components of said support linkage upon a single depression of said toggle plate assembly by said rider.

14. The pedal of claim 12, having additional said latches acting in unison, comprising:

a) said cavity having two said pockets formed in said outward side of said cavity, and two said pockets formed in said inward side of said cavity, b) a said latch articulably mounted in each said outward pocket, hereby referred to as outward latches, c) a said latch articulably mounted in each said inward pocket, hereby referred to as inward latches, thusly providing multiple and evenly distributed affixation means for securing said support linkage in a binding extended position, d) all said outward latches having additionally an actuating arm extending partially across said cavity towards said inward latches, e) all said inward latches having additionally an actuatable arm extending partially across said cavity towards said outward latches and formed to be actuatable by said actuating arm of said outward latch, thusly providing for the simultaneous release of all said latches from said latch engaged components of said support linkage upon a single depression of said toggle plate assembly by said rider.

15. The pedal of claim 11 having additionally, a gripping means for facilitating said rider actuated articulation of said support linkage from said binding retracted position to said binding extended position, comprising a finger grippable feature on a generally rearward portion of each said binding.

* * * * *